(12) United States Patent
Matsuzawa et al.

(10) Patent No.: US 10,215,649 B2
(45) Date of Patent: Feb. 26, 2019

(54) FORCE DETECTOR, ROBOT, ELECTRONIC COMPONENT CARRYING APPARATUS, ELECTRONIC COMPONENT TESTING APPARATUS, PART PROCESSING APPARATUS, AND MOVING OBJECT

(71) Applicant: Seiko Epson Corporation, Tokyo (JP)

(72) Inventors: Akira Matsuzawa, Shiojiri (JP); Hiroki Kawai, Matsumoto (JP); Toshiyuki Kamiya, Fujimi-machi (JP)

(73) Assignee: Seiko Epson Corporation (JP)

( * ) Notice: Subject to any disclaimer, the term of this patent is extended or adjusted under 35 U.S.C. 154(b) by 47 days.

(21) Appl. No.: 15/461,961

(22) Filed: Mar. 17, 2017

(65) Prior Publication Data

US 2017/0184460 A1 Jun. 29, 2017

Related U.S. Application Data

(62) Division of application No. 14/200,925, filed on Mar. 7, 2014, now Pat. No. 9,651,433.

(30) Foreign Application Priority Data

Jun. 13, 2013 (JP) .................................. 2013-124419

(51) Int. Cl.
| | |
|---|---|
| *G01L 1/16* | (2006.01) |
| *G01L 5/00* | (2006.01) |
| *B25J 13/08* | (2006.01) |
| *B25J 19/02* | (2006.01) |

(52) U.S. Cl.
CPC ............... *G01L 1/16* (2013.01); *B25J 13/085* (2013.01); *B25J 19/028* (2013.01); *G01L 5/009* (2013.01); *Y10S 901/46* (2013.01); *Y10T 74/20335* (2015.01)

(58) Field of Classification Search
None
See application file for complete search history.

(56) References Cited

U.S. PATENT DOCUMENTS

| | | | |
|---|---|---|---|
| 5,297,430 | A | 3/1994 | Sonderegger et al. |
| 7,132,029 | B2 | 11/2006 | Nakatani et al. |
| 7,134,327 | B2 | 11/2006 | Saito et al. |
| 8,106,325 | B2 | 1/2012 | Laurent et al. |
| 8,146,440 | B2 | 4/2012 | Lin et al. |

(Continued)

FOREIGN PATENT DOCUMENTS

| | | |
|---|---|---|
| JP | 04-231827 | 8/1992 |
| JP | 04-315021 A | 11/1992 |
| JP | 05-075635 U | 10/1993 |

*Primary Examiner* — Peter J Macchiarolo
*Assistant Examiner* — Jermaine L Jenkins
(74) *Attorney, Agent, or Firm* — Harness, Dickey & Pierce, P.L.C.

(57) ABSTRACT

A force detector includes a first substrate, a second substrate, a circuit board provided between the first substrate and the second substrate, and an element mounted on the circuit board and outputting a signal in response to an external force, wherein a hole is formed in the circuit board at a location where the element is placed, and a first convex part inserted into the hole and protruding toward the element is provided on the first substrate. Further, the element is placed within a periphery of the first convex part as seen from a direction perpendicular to the first substrate.

20 Claims, 15 Drawing Sheets

(56) References Cited

U.S. PATENT DOCUMENTS

| | | | |
|---|---|---|---|
| 8,869,632 B2 * | 10/2014 | Tsuchiya | B25J 13/085 |
| | | | 73/862.59 |
| 8,887,582 B2 * | 11/2014 | Suzuki | G01L 1/162 |
| | | | 73/862.59 |
| 9,046,432 B2 | 6/2015 | Oka et al. | |
| 9,127,996 B2 | 9/2015 | Kawai et al. | |
| 9,481,089 B2 * | 11/2016 | Matsuzawa | B25J 9/1694 |
| 2010/0058875 A1 * | 3/2010 | Baumgartner | G01L 9/008 |
| | | | 73/723 |
| 2015/0127159 A1 * | 5/2015 | Kamiya | G01P 15/18 |
| | | | 700/258 |
| 2015/0266184 A1 | 9/2015 | Arakawa | |

\* cited by examiner

FORCE DETECTOR, ROBOT, ELECTRONIC COMPONENT CARRYING APPARATUS, ELECTRONIC COMPONENT TESTING APPARATUS, PART PROCESSING APPARATUS, AND MOVING OBJECT

CROSS-REFERENCE TO RELATED APPLICATIONS

This is a divisional application of U.S. application Ser. No. 14/200,925 filed Mar. 7, 2014, which claims priority to Japanese Patent Application No. 2013-124419 filed Jun. 13, 2013 both of which are expressly incorporated by reference herein in their entireties.

BACKGROUND

1. Technical Field

The present invention relates to a force detector, a robot, an electronic component carrying apparatus, an electronic component testing apparatus, a part processing apparatus, and a moving object.

2. Related Art

Recently, the introduction of industrial robots to production facilities such as factories has been promoted for improving production efficiency. The industrial robot has an arm that is drivable with respect to a direction along a single axis or directions along multiple axes, and an end effector attached to the arm distal end, such as a hand, a part testing tool or a part carrying tool, and may execute part assembly work, part manufacturing work including part processing work, part carrying work, part testing work, and the like.

In the industrial robot, for example, a force detector is provided between the arm and the end effector. As the force detector used for the industrial robot, for example, a force detector as disclosed in JP-A-4-231827 is used. The force detector described in JP-A-4-231827 includes a pair of substrates and an element provided between the pair of substrates and having a crystal disc. Further, the element is pressurized. When an external force is applied to the substrates, the pair of substrates are relatively displaced, and a force acting between the pair of substrates is detected by the element. In the force detector using the element having the crystal disc, deformation of the crystal disc due to the external force is converted into a voltage and output.

However, in the force detector in the related art, a circuit board including a circuit for converting charge output from the crystal disc into a voltage and the like is provided outside of the pair of substrates, and accordingly, upsizing of the entire detector is problematic.

In order to solve the above problem and downsize the entire detector, it is conceivable to place the circuit board between the pair of substrates and to mount the element on the circuit board.

However, the circuit board intervenes between a pressing plate and the element and the circuit board serves as a buffer and the force applied to the element is dispersed. Thus, there is a problem that pressurization on the element is insufficient and the accuracy of force detection is lowered.

SUMMARY

An advantage of some aspects of the invention is to provide a force detector that may improve the accuracy of force detection while downsizing the detector, a robot, an electronic component carrying apparatus, an electronic component testing apparatus, a part processing apparatus, and a moving object.

A force detector according to an aspect of the invention includes a first substrate, a second substrate, a circuit board provided between the first substrate and the second substrate, and an element mounted on the circuit board and outputting a signal in response to an external force, wherein a hole is formed in the circuit board at a location where the element is placed, and a first convex part inserted into the hole and protruding toward the element is provided on the first substrate.

The circuit board is provided between the first substrate and the second substrate, and thereby, the detector may be downsized.

Further, the element may be sandwiched by the first convex part and the second substrate and not via the circuit board. Thereby, dispersion of the force applied to the element by the buffering function of the circuit board may be prevented, and thus, the element may be sufficiently pressurized and the accuracy of force detection may be improved.

In the force detector according to the aspect of the invention, it is preferable that the element is placed within a periphery of the first convex part as seen from a direction perpendicular to the first substrate.

With this configuration, during force detection, the external force applied to the first substrate or the second substrate is applied to the entire element, a larger detection signal is obtained compared to the case where the external force is applied to part of the element, and thus, force detection with higher accuracy may be performed.

In the force detector according to the aspect of the invention, it is preferable that the element is sandwiched between the first convex part and the second substrate.

With this configuration, the element may be pressurized, and thus, forces in both positive and negative directions may be detected.

In the force detector according to the aspect of the invention, it is preferable that the element is pressurized by the first convex part and the second substrate.

With this configuration, forces in both positive and negative directions may be detected.

In the force detector according to the aspect of the invention, it is preferable that a surface facing the first substrate in the second substrate is a flat (planar) surface.

With this configuration, alignment of the second substrate with the element is not necessary during manufacturing and the force detector may be readily manufactured.

In the force detector according to the aspect of the invention, it is preferable that a second convex part protruding toward the element is provided on the second substrate, and the element is placed between the first convex part and the second convex part.

With this configuration, the element may be sandwiched by the first convex part and the second convex part and not via the circuit board. Thereby, dispersion of the force applied to the element by the buffering function of the circuit board may be prevented, and thus, the element may be sufficiently pressurized and the accuracy of force detection may be improved.

In the force detector according to the aspect of the invention, it is preferable that the element is placed within a periphery of the second convex part as seen from a direction perpendicular to the first substrate.

With this configuration, when performing force detection, the external force applied to the first substrate or the second substrate is applied to the entire element, a larger detection signal is obtained compared to the case where the external force is applied to part of the element, and thus, force detection with higher accuracy may be performed.

In the force detector according to the aspect of the invention, it is preferable that the element is sandwiched by the first convex part and the second convex part.

With this configuration, the element may be pressurized, and thus, forces in both positive and negative directions may be detected.

In the force detector according to the aspect of the invention, it is preferable that a first member provided with the element and having a concave portion, and a second member sealing the concave portion are provided.

With this configuration, gas resistance and water resistance are improved. That is, the element may be protected by the first member and the second member, and the force detector with higher reliability may be provided.

In the force detector according to the aspect of the invention, it is preferable that the first convex part is in contact with the first member.

With this configuration, the element may be sandwiched by the first convex part and the second substrate via the first member, the element may be pressurized, and thus, forces in both positive and negative directions may be detected.

In the force detector according to the aspect of the invention, it is preferable that a terminal electrically connected to the element and the circuit board is provided on the first member.

With this configuration, the element and the circuit board may be electrically connected by a simple configuration, and thus, labor, time, and cost when manufacturing the force detector may be reduced.

In the force detector according to the aspect of the invention, it is preferable that a plurality of the elements are provided, wherein the elements are placed at equal angular intervals along a circumference (periphery) of the first substrate or the second substrate.

With this configuration, external forces may be detected without deviation and force detection with higher accuracy may be performed.

In the force detector according to the aspect of the invention, it is preferable that a surface of the first substrate and a surface of the second substrate face each other at a distance such that the first convex part is located therebetween.

With this configuration, the external force applied to the first substrate or the second substrate may be applied to the element by the first convex part and the second substrate and not via the circuit board. Thereby, dispersion of the force applied to the element by the buffering function of the circuit board may be prevented, and thus, the element may be sufficiently pressurized and the accuracy of force detection may be improved.

In the force detector according to the aspect of the invention, it is preferable that the hole is a through hole penetrating the circuit board.

With this configuration, the element may be sandwiched by the first convex part and the second substrate, and not via the circuit board. Thereby, dispersion of the force applied to the element by the buffering function of the circuit board may be prevented, and thus, the element may be sufficiently pressurized and the accuracy of force detection may be improved.

A robot according to another aspect of the invention includes an arm, an end effector provided on the arm, and a force detector provided between the arm and the end effector and detecting an external force applied to the end effector, the force detector including a first substrate, a second substrate, a circuit board provided between the first substrate and the second substrate, and an element mounted on the circuit board and outputting a signal in response to the external force, wherein a hole is formed in the circuit board at a location where the element is placed, and a first convex part inserted into the hole and protruding toward the element is provided on the first substrate.

With this configuration, the same advantages as those of the force detector according to the aspect of the invention may be obtained. Further, the external force detected by the force detector may be fed back and work may be executed more precisely. Furthermore, the end effector in contact with an obstacle or the like may be sensed using the external force detected by the force detector. Accordingly, an obstacle avoidance operation, an object damage avoidance operation, and the like that have been difficult to perform by position control in the related art may be easily performed, and work may be executed more safely.

An electronic component carrying apparatus according to still another aspect of the invention includes a grasping part that grasps an electronic component, and a force detector that detects an external force applied to the grasping part, the force detector including a first substrate, a second substrate, a circuit board provided between the first substrate and the second substrate, and an element mounted on the circuit board and outputting a signal in response to the external force, wherein a hole is formed in the circuit board at a location where the element is placed, and a first convex part inserted into the hole and protruding toward the element is provided on the first substrate.

With this configuration, the same advantages as those of the force detector according to the aspect of the invention may be obtained. Further, the external force detected by the force detector is fed back and work may be executed more precisely. Furthermore, the grasping part in contact with an obstacle or the like may be sensed using the external force detected by the force detector. Accordingly, an obstacle avoidance operation, an object damage avoidance operation, and the like that have been difficult to perform by the position control in the related art may be easily performed, and electronic part carrying work may be executed more safely.

An electronic component testing apparatus according to yet another aspect of the invention includes a grasping part that grasps an electronic component, a testing part that tests the electronic component, and a force detector that detects an external force applied to the grasping part, the force detector including a first substrate, a second substrate, a circuit board provided between the first substrate and the second substrate, and an element mounted on the circuit board and outputting a signal in response to the external force, wherein a hole is formed in the circuit board at a location where the element is placed, and a first convex part inserted into the hole and protruding toward the element is provided on the first substrate.

With this configuration, the same advantages as those of the force detector according to the aspect of the invention may be obtained. Further, the external force detected by the force detector is fed back and work may be executed more precisely. Furthermore, the grasping part in contact with an obstacle or the like may be sensed using the external force detected by the force detector. Accordingly, an obstacle avoidance operation, an object damage avoidance operation, and the like that have been difficult to perform by the position control in the related art may be easily performed, and electronic component testing work may be executed more safely.

Apart processing apparatus according to still yet another aspect of the invention includes a tool displacement unit attached with a tool and displacing the tool, and a force detector that detects an external force applied to the tool, the force detector including a first substrate, a second substrate, a circuit board provided between the first substrate and the second substrate, and an element mounted on the circuit board and outputting a signal in response to the external force, wherein a hole is formed in the circuit board at a location where the element is placed, and a first convex part inserted into the hole and protruding toward the element is provided on the first substrate.

With this configuration, the same advantages as those of the force detector according to the aspect of the invention may be obtained. Further, the external force detected by the force detector is fed back, and thereby, the part processing apparatus may execute part processing work more precisely. Furthermore, the tool in contact with an obstacle or the like may be sensed using the external force detected by the force detector. Accordingly, when an obstacle or the like is brought into contact with the tool, an emergency stop may be executed, and the part processing apparatus may execute safer part processing work.

A moving object according to further another aspect of the invention includes a power unit that supplies power for movement, and a force detector that detects an external force generated by the movement, the force detector including a first substrate, a second substrate, a circuit board provided between the first substrate and the second substrate, and an element mounted on the circuit board and outputting a signal in response to the external force, wherein a hole is formed in the circuit board at a location where the element is placed, and a first convex part inserted into the hole and protruding toward the element is provided on the first substrate.

With this configuration, the same advantages as those of the force detector according to the aspect of the invention may be obtained. Further, the force detector may detect external forces by vibration, acceleration, or the like generated with the movement, and the moving object may execute control including attitude control, vibration control, and acceleration control.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Below, a force detector, a robot, an electronic component carrying apparatus, an electronic component testing apparatus, a part processing apparatus, and a moving object of the invention will be explained in detail according to embodiments shown in the accompanying drawings.

First Embodiment

Figure 1:
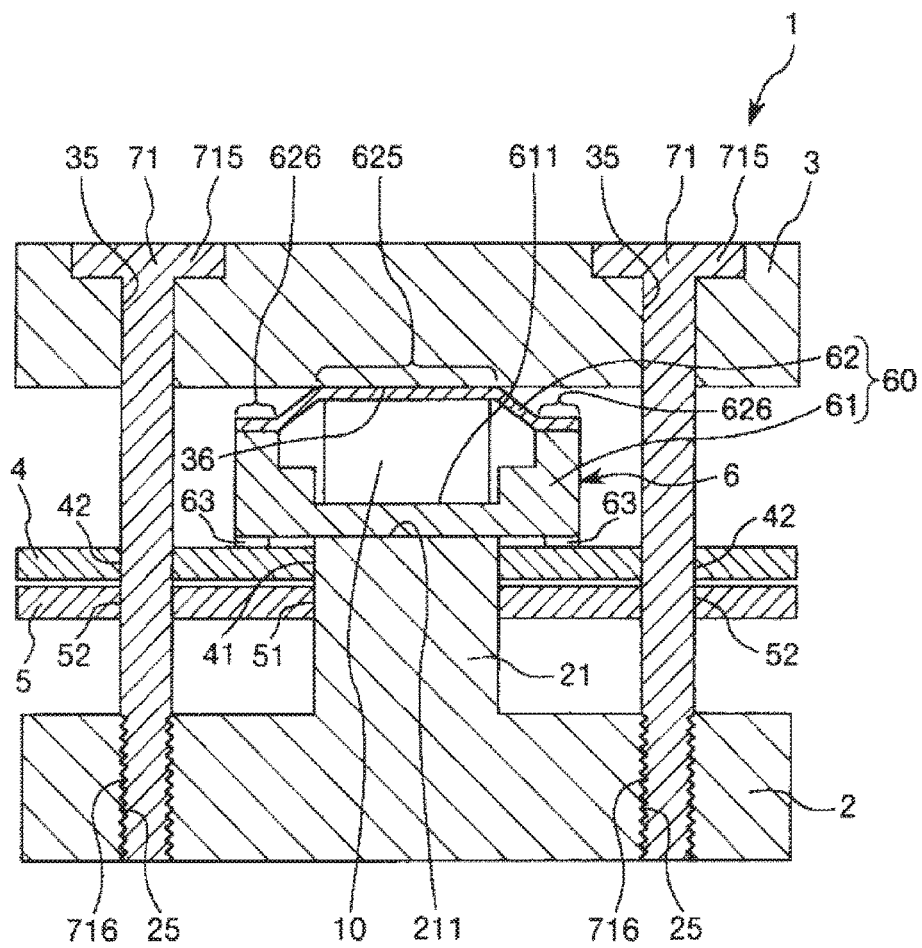
FIG. 1 is a sectional view showing a force detector according to a first embodiment of the invention.
Figure 2:
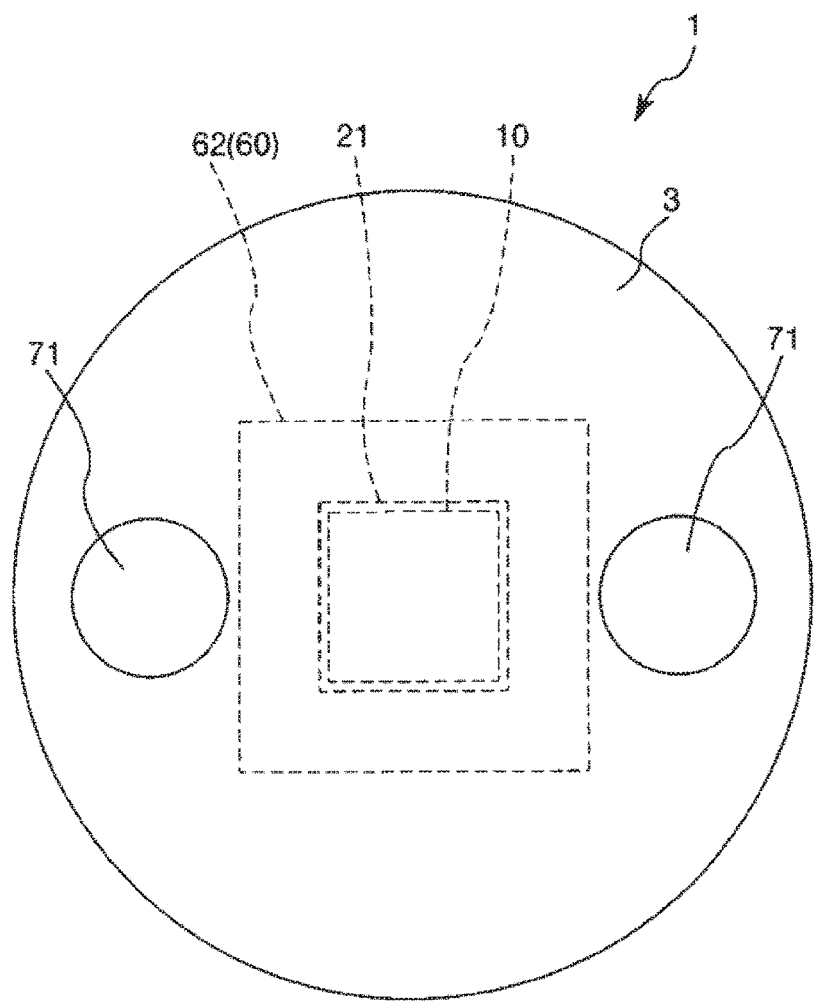
FIG. 2 is a plan view of the force detector shown in FIG. 1.
Figure 3:
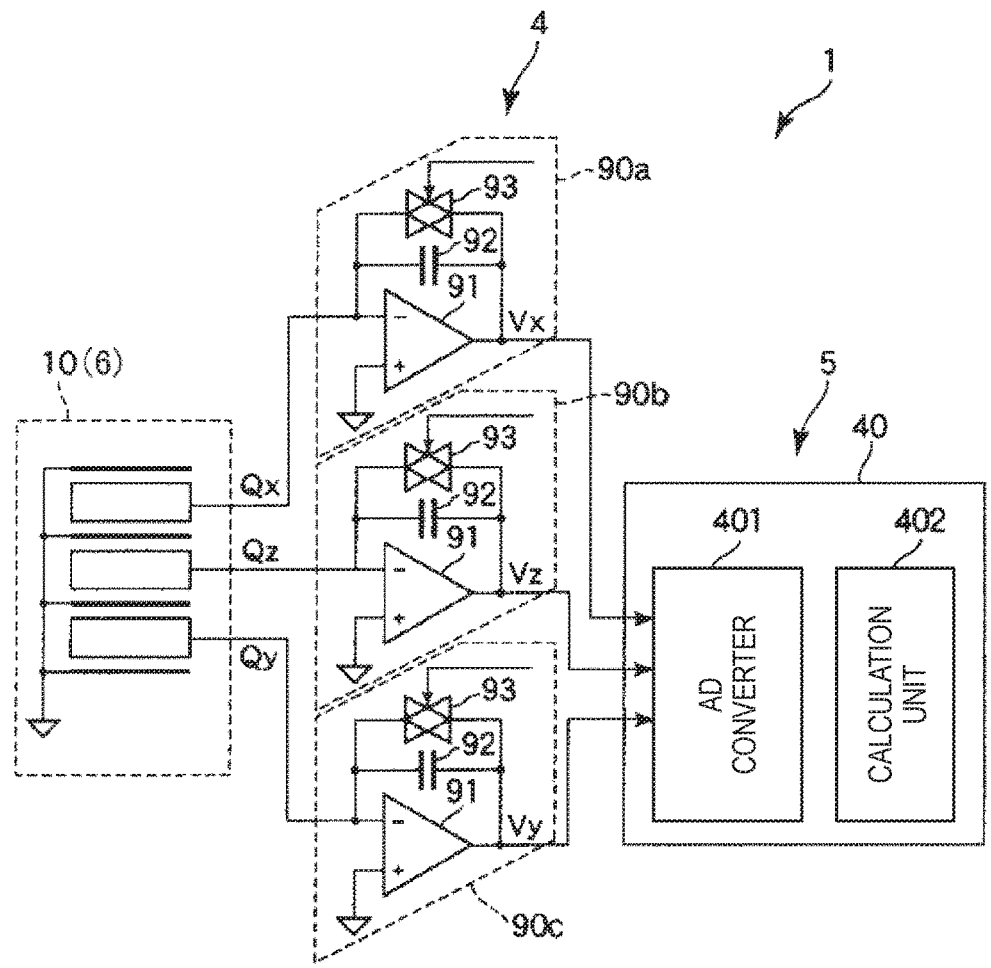
FIG. 3 is a circuit diagram schematically showing the force detector shown in FIG. 1.
Figure 4:
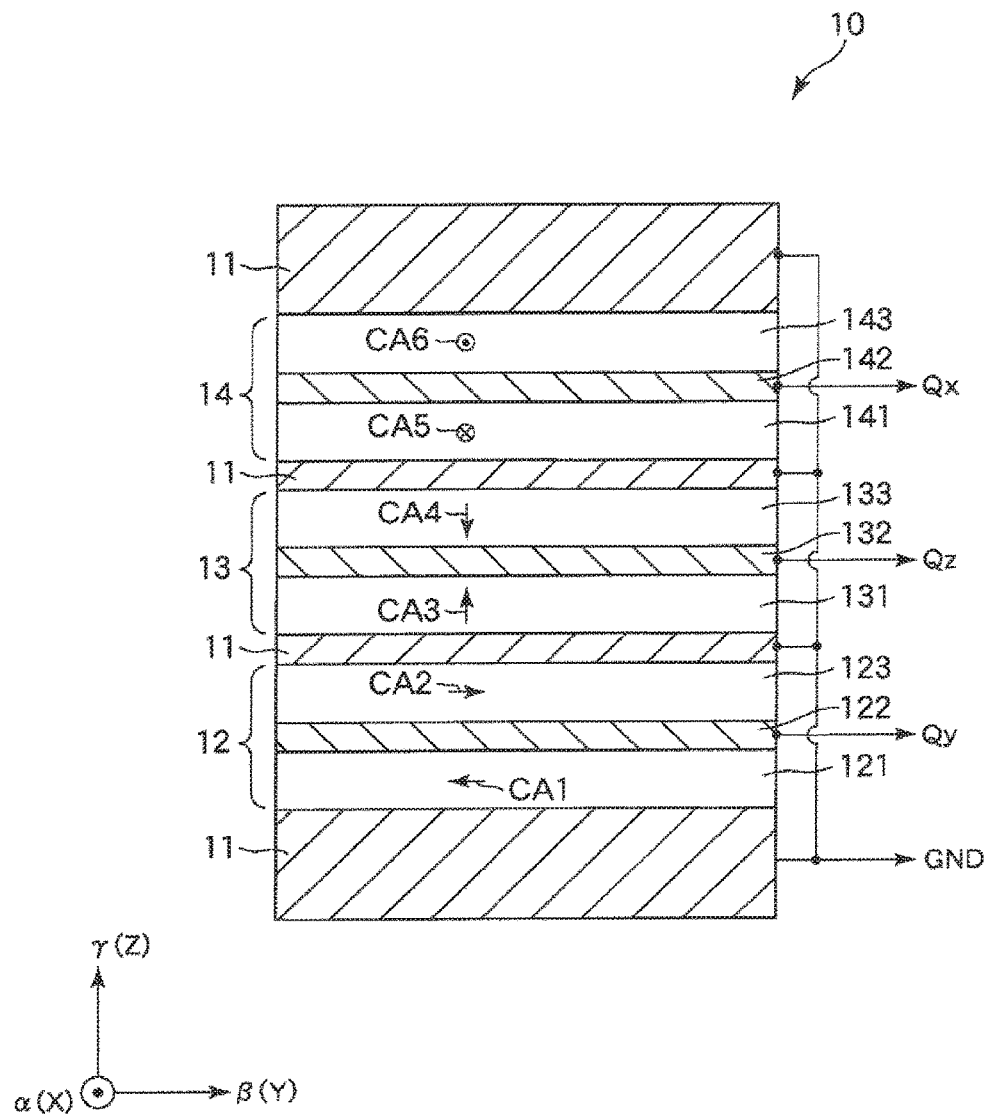
FIG. 4 is a sectional view schematically showing a charge output element of the force detector shown in FIG. 1.

FIG. 1 is a sectional view showing a force detector according to the first embodiment of the invention. FIG. 2 is a plan view of the force detector shown in FIG. 1. FIG. 3 is a circuit diagram schematically showing the force detector shown in FIG. 1. FIG. 4 is a sectional view schematically showing a charge output element of the force detector shown in FIG. 1.

Note that, below, for convenience of explanation, the upside in FIG. 1 will be referred to as "upper" or "over" and the downside will be referred to as "lower" or "under".

The force detector 1 shown in FIGS. 1 and 2 has a function of detecting external forces (including moment). That is, the detector has a function of detecting external forces applied along three axes ($\alpha$(X)-axis, $\beta$(Y)-axis, $\gamma$(Z)-axis) orthogonal to one another.

The force detector 1 includes a first substrate 2, a second substrate 3 placed at a predetermined distance from the first substrate 2 and facing the first substrate 2, an analog circuit board (circuit board) 4 provided between the first substrate 2 and the second substrate 3, a digital circuit board 5 provided between the first substrate 2 and the second substrate 3 and electrically connected to the analog circuit board 4, a sensor device 6 mounted on the analog circuit board 4 and having a charge output element (element) 10 that outputs a signal in response to an applied external force and a package 60 that houses the charge output element 10, and two pressurization bolts (securing member) 71.

As shown in FIG. 3, the analog circuit board 4 includes a conversion output circuit 90a that converts charge Qx output from the charge output element 10 of the mounted sensor device 6 into a voltage Vx, a conversion output circuit 90b that converts charge Qz output from the charge output element 10 into a voltage Vz, and a conversion output circuit 90c that converts charge Qy output from the charge output element 10 into a voltage Vy. Further, the digital circuit board 5 includes an external force detection circuit 40 that detects an applied external force. The digital circuit board 5 is placed closer to the first substrate 2 than the analog circuit board 4, i.e., between the analog circuit board 4 and the first substrate.

As shown in FIG. 1, the sensor device 6 is placed on a surface of the analog circuit board 4 toward the second substrate 3 side, and sandwiched by a convex part (first convex part) 21, which will be described later, provided on the first substrate 2 and the second substrate 3. That is, the charge output element 10 is sandwiched by the convex part 21 and the second substrate 3 via the package 60 and pressurized. Note that either of the first substrate 2 and the second substrate 3 may be used as the substrate to which a force is applied, and, in the embodiment, the explanation will be made with the second substrate 3 as the substrate to which a force is applied. Further, the charge output element 10 may be placed on a surface of the analog circuit board 4 toward the first substrate 2 side.

The respective shapes of the first substrate 2, the second substrate 3, the analog circuit board 4, and the digital circuit board 5 are not particularly limited, however, in the embodiment, their outer shapes are circular shapes in the plan view of the first substrate 2, the second substrate 3, the analog circuit board 4, and the digital circuit board 5. Note that the other outer shapes of the first substrate 2, the second substrate 3, the analog circuit board 4, and the digital circuit board 5 in the plan view include polygonal shapes including rectangular shapes and pentagonal shapes, elliptical shapes, and the like, for example. Further, the respective constituent materials for the first substrate 2, the second substrate 3, the other parts than the respective elements and respective wires of the analog circuit board 4 and the other parts than the respective elements and respective wires of the digital circuit board 5 are not particularly limited, however, various resin materials, various metal materials, and the like may be used, for example.

Charge Output Element (Element)

The charge output element 10 has a function of outputting three charges Qx, Qy, Qx in response to the respective external forces applied (received) along the three axes (α(X)-axis, β(Y)-axis, γ(Z)-axis) orthogonal to one another.

The shape of the charge output element 10 is not particularly limited, however, in the embodiment, it is square in the plan view of the first substrate 2, i.e., as seen from a direction perpendicular to the first substrate 2. Note that the other outer shapes of the charge output element 10 in the plan view include other polygonal shapes including a pentagonal shape, a circular shape, an elliptical shape, and the like for example.

As shown in FIG. 4, the charge output element 10 has four ground electrode layers 11 grounded to the ground (reference potential point), a first sensor 12 that outputs the charge Qy in response to the external force in parallel to the β-axis (shear force), a second sensor 13 that outputs the charge Qz in response to the external force in parallel to the γ-axis (compression and tension force), and a third sensor 14 that outputs the charge Qx in response to the external force in parallel to the a-axis (shear force), and the ground electrode layers 11 and the sensors 12, 13, 14 are alternately stacked. Note that, in FIG. 4, the stacking direction of the ground electrode layers 11 and the sensors 12, 13, 14 is the γ-axis direction and the respective directions orthogonal to the γ-axis direction and orthogonal to each other are the a-axis direction and the β-axis direction.

In the illustrated configuration, the first sensor 12, the second sensor 13, and the third sensor 14 are sequentially stacked from the downside in FIG. 4, however, the invention is not limited to that. The stacking sequence of the sensors 12, 13, 14 is arbitrary.

The ground electrode layer 11 is an electrode grounded to the ground (reference potential point). The material forming the ground electrode layer 11 is not particularly limited, however, for example, gold, titanium, aluminum, copper, iron, or an alloy containing them are preferable. Of these, particularly, stainless steel as an iron alloy is preferable. The ground electrode layer formed by stainless steel has advantageous durability and corrosion resistance.

The first sensor 12 has a function of outputting the charge Qy in response to the external force (shear force) applied (received) along the β-axis. The first sensor 12 is adapted to output positive charge in response to the external force applied along the positive direction of the β-axis, and output negative charge in response to the external force applied along the negative direction of the β-axis.

The first sensor 12 includes a first piezoelectric layer 121 having a first crystal axis CA1, a second piezoelectric layer 123 provided to face the first piezoelectric layer 121 and having a second crystal axis CA2, and an output electrode layer 122 provided between the first piezoelectric layer 121 and the second piezoelectric layer 123 and outputting charge Q.

The first piezoelectric layer 121 is formed by a piezoelectric material having the first crystal axis CA1 oriented in the negative direction of the β-axis. When an external force along the positive direction of the β-axis is applied to the surface of the first piezoelectric layer 121, charge is induced within the first piezoelectric layer 121 due to the piezoelectric effect. As a result, positive charge collects near the surface of the first piezoelectric layer 121 toward the output electrode layer 122 side, and negative charge collects near the surface of the first piezoelectric layer 121 toward the ground electrode layer 11 side. Similarly, when an external force along the negative direction of the β-axis is applied to the surface of the first piezoelectric layer 121, negative charge collects near the surface of the first piezoelectric layer 121 toward the output electrode layer 122 side, and positive charge collects near the surface of the first piezoelectric layer 121 toward the ground electrode layer 11 side.

The second piezoelectric layer 123 is formed by a piezoelectric material having the second crystal axis CA2 oriented in the positive direction of the β-axis. When an external force along the positive direction of the β-axis is applied to the surface of the second piezoelectric layer 123, charge is induced within the second piezoelectric layer 123 due to the piezoelectric effect. As a result, positive charge collects near the surface of the second piezoelectric layer 123 toward the output electrode layer 122 side, and negative charge collects near the surface of the second piezoelectric layer 123 toward the ground electrode layer 11 side. Similarly, when an external force along the negative direction of the β-axis is applied to the surface of the second piezoelectric layer 123, negative charge collects near the surface of the second piezoelectric layer 123 toward the output electrode layer 122 side, and positive charge collects near the surface of the second piezoelectric layer 123 toward the ground electrode layer 11 side.

As described above, the first crystal axis CA1 of the first piezoelectric layer 121 is directed in the opposite direction to the direction of the second crystal axis CA2 of the second piezoelectric layer 123. Thereby, in comparison with the case where the first sensor 12 is formed by only one of the first piezoelectric layer 121 and the second piezoelectric layer 123 and the output electrode layer 122, the positive charge or the negative charge collecting near the output electrode layer 122 may be increased. As a result, the charge Q output from the output electrode layer 122 may be increased.

Note that the constituent materials of the first piezoelectric layer 121 and the second piezoelectric layer 123 include crystal, topaz, barium titanate, lead titanate, lead zirconate titanate (PZT: $Pb(Zr,Ti)O_3$), lithium niobate, lithium tantalate, and the like. Of these, particularly, crystal is preferable. This is because the piezoelectric layer formed by crystal has advantageous properties including a wider dynamic range, higher stiffness, a higher natural frequency, higher load bearing, and the like. Further, the piezoelectric layer that generates charge in response to the external force (shear force) along the surface direction of the layer like the first piezoelectric layer 121 and the second piezoelectric layer 123 may be formed using Y-cut crystal.

The output electrode layer 122 has a function of outputting the positive charge or negative charge generated within the first piezoelectric layer 121 and the second piezoelectric layer 123 as the charge Qy. As described above, when an external force along the positive direction of the β-axis is applied to the surface of the first piezoelectric layer 121 or the surface of the second piezoelectric layer 123, positive charge collects near the output electrode layer 122. As a result, positive charge Qy is output from the output electrode layer 122. On the other hand, when an external force along the negative direction of the β-axis is applied to the surface of the first piezoelectric layer 121 or the surface of the second piezoelectric layer 123, negative charge collects near the output electrode layer 122. As a result, negative charge Qy is output from the output electrode layer 122.

Further, it is preferable that the width of the output electrode layer 122 is equal to or more than the widths of the first piezoelectric layer 121 and the second piezoelectric layer 123. When the width of the output electrode layer 122 is smaller than that of the first piezoelectric layer 121 or the second piezoelectric layer 123, part of the first piezoelectric layer 121 or the second piezoelectric layer 123 is not in contact with the output electrode layer 122. Accordingly, it may be impossible to output part of the charge generated in the first piezoelectric layer 121 or the second piezoelectric layer 123 from the output electrode layer 122. As a result, the charge Qy output from the output electrode layer 122 decreases. Note that the same applies to output electrode layers 132, 142 to be described later.

The second sensor 13 has a function of outputting the charge Qz in response to the external force (compression/tension force) applied (received) along the γ-axis. The second sensor 13 is adapted to output positive charge in response to the compression force in parallel to the γ-axis, and output negative charge in response to the tension force in parallel to the γ-axis.

The second sensor 13 includes a third piezoelectric layer 131 having a third crystal axis CA3, a fourth piezoelectric layer 133 provided to face the third piezoelectric layer 131 and having a fourth crystal axis CA4, and an output electrode layer 132 provided between the third piezoelectric layer 131 and the fourth piezoelectric layer 133 and outputting charge Qz.

The third piezoelectric layer 131 is formed by a piezoelectric material having the third crystal axis CA3 oriented in the positive direction of the γ-axis. When a compression force in parallel to the γ-axis is applied to the surface of the third piezoelectric layer 131, charge is induced within the third piezoelectric layer 131 due to the piezoelectric effect. As a result, positive charge collects near the surface of the third piezoelectric layer 131 toward the output electrode layer 132 side, and negative charge collects near the surface of the third piezoelectric layer 131 toward the ground electrode layer 11 side. Similarly, when a tension force in parallel to the γ-axis is applied to the surface of the third piezoelectric layer 131, negative charge collects near the surface of the third piezoelectric layer 131 toward the output electrode layer 132 side, and positive charge collects near the surface of the third piezoelectric layer 131 toward the ground electrode layer 11 side.

The fourth piezoelectric layer 133 is formed by a piezoelectric material having the fourth crystal axis CA4 oriented in the negative direction of the γ-axis. When a compression force in parallel to the γ-axis is applied to the surface of the fourth piezoelectric layer 133, charge is induced within the fourth piezoelectric layer 133 due to the piezoelectric effect. As a result, positive charge collects near the surface of the fourth piezoelectric layer 133 toward the output electrode layer 132 side, and negative charge collects near the surface of the fourth piezoelectric layer 133 toward the ground electrode layer 11 side. Similarly, when a tension force in parallel to the γ-axis is applied to the surface of the fourth piezoelectric layer 133, negative charge collects near the surface of the fourth piezoelectric layer 133 toward the output electrode layer 132 side, and positive charge collects near the surface of the fourth piezoelectric layer 133 toward the ground electrode layer 11 side.

As the constituent materials of the third piezoelectric layer 131 and the fourth piezoelectric layer 133, the same constituent materials as those of the first piezoelectric layer 121 and the second piezoelectric layer 123 may be used. Further, the piezoelectric layer that generates charge in response to the external force (compression/tension force) perpendicular to the surface direction of the layer like the third piezoelectric layer 131 and the fourth piezoelectric layer 133 may be formed using X-cut crystal.

The output electrode layer 132 has a function of outputting the positive charge or negative charge generated within the third piezoelectric layer 131 and the fourth piezoelectric layer 133 as the charge Qz. As described above, when a compression force in parallel to the γ-axis is applied to the surface of the third piezoelectric layer 131 or the surface of the fourth piezoelectric layer 133, positive charge collects near the output electrode layer 132. As a result, positive charge Qz is output from the output electrode layer 132. On the other hand, when a tension force in parallel to the γ-axis is applied to the surface of the third piezoelectric layer 131 or the surface of the fourth piezoelectric layer 133, negative charge collects near the output electrode layer 132. As a result, negative charge Qz is output from the output electrode layer 132.

The third sensor 14 has a function of outputting the charge Qx in response to the external force (shear force) applied (received) along the a-axis. The third sensor 14 is adapted to output positive charge in response to the external force applied along the positive direction of the a-axis, and output negative charge in response to the external force applied along the negative direction of the a-axis.

The third sensor 14 includes a fifth piezoelectric layer 141 having a fifth crystal axis CA5, a sixth piezoelectric layer 143 provided to face the fifth piezoelectric layer 141 and having a sixth crystal axis CA6, and an output electrode layer 142 provided between the fifth piezoelectric layer 141 and the sixth piezoelectric layer 143 and outputting charge Qx.

The fifth piezoelectric layer 141 is formed by a piezoelectric material having the fifth crystal axis CA5 oriented in the negative direction of the α-axis. When an external force along the positive direction of the α-axis is applied to the surface of the fifth piezoelectric layer 141, charge is induced within the fifth piezoelectric layer 141 due to the piezoelectric effect. As a result, positive charge collects near the surface of the fifth piezoelectric layer 141 toward the output electrode layer 142 side, and negative charge collects near the surface of the fifth piezoelectric layer 141 toward the ground electrode layer 11 side. Similarly, when an external force along the negative direction of the α-axis is applied to the surface of the fifth piezoelectric layer 141, negative charge collects near the surface of the fifth piezoelectric layer 141 toward the output electrode layer 142 side, and positive charge collects near the surface of the fifth piezoelectric layer 141 toward the ground electrode layer 11 side.

The sixth piezoelectric layer 143 is formed by a piezoelectric material having the sixth crystal axis CA6 oriented in the positive direction of the α-axis. When an external force along the positive direction of the α-axis is applied to the surface of the sixth piezoelectric layer 143, charge is induced within the sixth piezoelectric layer 143 due to the piezoelectric effect. As a result, positive charge collects near the surface of the sixth piezoelectric layer 143 toward the output electrode layer 142 side, and negative charge collects near the surface of the sixth piezoelectric layer 143 toward the ground electrode layer 11 side. Similarly, when an external force along the negative direction of the α-axis is applied to the surface of the sixth piezoelectric layer 143, negative charge collects near the surface of the sixth piezoelectric layer 143 toward the output electrode layer 142 side, and positive charge collects near the surface of the sixth piezoelectric layer 143 toward the ground electrode layer 11 side.

As the constituent materials of the fifth piezoelectric layer 141 and the sixth piezoelectric layer 143, the same constituent materials as those of the first piezoelectric layer 121 and the second piezoelectric layer 123 may be used. Further, the piezoelectric layer that generates charge in response to the external force (shear force) along the surface direction of the layer like the fifth piezoelectric layer 141 and the sixth piezoelectric layer 143 may be formed using Y-cut crystal like the first piezoelectric layer 121 and the second piezoelectric layer 123.

The output electrode layer 142 has a function of outputting the positive charge or negative charge generated within the fifth piezoelectric layer 141 and the sixth piezoelectric layer 143 as the charge Qx. As described above, when an external force along the positive direction of the α-axis is applied to the surface of the fifth piezoelectric layer 141 or the surface of the sixth piezoelectric layer 143, positive charge collects near the output electrode layer 142. As a result, positive charge Qx is output from the output electrode layer 142. On the other hand, when an external force along the negative direction of the α-axis is applied to the surface of the fifth piezoelectric layer 141 or the surface of the sixth piezoelectric layer 143, negative charge collects near the output electrode layer 142. As a result, negative charge Qx is output from the output electrode layer 142.

As described above, the first sensor 12, the second sensor 13, and the third sensor 14 are stacked so that force detection directions of the respective sensors may be orthogonal to one another. Thereby, the respective sensors may induce charge in response to force components orthogonal to one another. Accordingly, the charge output element 10 may output the three charges Qx, Qy, Qz in response to the respective external forces along the three axes (α(X)-axis, β(Y)-axis, γ(Z)-axis).

Sensor Device

The sensor device 6 has the charge output element 10 and the package 60 housing the charge output element 10.

The package 60 includes a base part (first member) 61 having a concave portion 611 (recess), and a lid member (second member) 62 bonded to the base part 61. The charge output element 10 is placed in the concave portion 611 of the base part 61 and the concave portion 611 of the base part 61 is sealed by the lid member 62. Thereby, the charge output element 10 may be protected and the force detector 1 with higher reliability may be provided. Note that the upper surface of the charge output element 10 is in contact with the lid member 62. Further, the lid member 62 of the package 60 is placed on the upside, i.e., a side toward the second substrate 3, the base part 61 is placed on the downside, i.e., a side toward the first substrate 2, and the base part 61 is fixed to the analog circuit board 4. According to the configuration, the base part 61 and the lid member 62 are sandwiched and pressurized by the convex part 21 and the second substrate 3, and the charge output element 10 is sandwiched and pressurized by the base part 61 and the lid member 62.

Further, the constituent material of the base part 61 is not particularly limited, however, for example, insulating materials including ceramics may be used. Furthermore, the constituent material of the lid member 62 is not particularly limited, however, for example, various metal materials including stainless steel may be used. Note that the constituent material of the base part 61 and the constituent material of the lid member 62 may be the same or different.

The shape of the package 60 is not particularly limited, however, in the embodiment, it is square in the plan view of the first substrate 2. Note that the other outer shapes of the package 60 in the plan view include other polygonal shapes including a pentagonal shape, a circular shape, an elliptical shape, and the like for example. Further, in the case where the shape of the package 60 is a polygonal shape, for example, the corner parts may be rounded or obliquely cut out.

Further, the lid member 62 has a plate-like shape in the embodiment, and the portion between a center part 625 and an outer peripheral part 626 thereof bends, and the center part 625 protrudes toward the second substrate 3. The shape of the center part 625 is not particularly limited, however, in the embodiment, it is the same shape as that of the charge output element 10, i.e., square in the plan view of the first substrate 2. Note that both the upper surface and the lower surface of the center part 625 of the lid member 62 are flat surfaces.

Furthermore, a plurality of terminals 63 electrically connected to the charge output element 10 are provided at the ends of the lower surface of the base part 61 of the package 60. The respective terminals 63 are electrically connected to the analog circuit board 4, and thereby, the charge output element 10 and the analog circuit board 4 are electrically connected. Note that the number of terminals 63 is not particularly limited, however, in the embodiment, it is four. That is, the terminals 63 are respectively provided in the four corner parts of the base part 61.

Conversion Output Circuit

The conversion output circuits 90a, 90b, 90c are connected to the charge output element 10. The output circuit 90a has a function of converting the charge Qx output from the charge output element 10 into the voltage Vx. The output circuit 90b has a function of converting the charge Qz output from the charge output element 10 into the voltage Vz. The output circuit 90c has a function of converting the charge Qy output from the charge output element 10 into the voltage Vy. The conversion output circuits 90a, 90b, 90c are the same, and the output circuit 90c will be representatively explained below.

The conversion output circuit 90c has the function of converting the charge Qy output from the charge output element 10 into the voltage Vy and outputting the voltage Vy. The conversion output circuit 90c has an operation amplifier 91, a capacitor 92, and a switching element 93. The first input terminal (negative input) of the operation amplifier 91 is connected to the output electrode layer 122 of the charge output element 10, and the second input terminal (positive input) of the operation amplifier 91 is grounded to the ground (reference potential point). Further, the output terminal of the operation amplifier 91 is connected to the external force detection circuit 40. The capacitor 92 is connected between the first input terminal and the output terminal of the operation amplifier 91. The switching element 93 is connected between the first input terminal and the output terminal of the operation amplifier 91 and parallel-connected to the capacitor 92. Furthermore, the switching element 93 is connected to a drive circuit (not shown), and the switching element 93 executes switching operation according to on/off signals from the drive circuit.

When the switching element 93 is off, the charge Qy output from the charge output element 10 is stored in the capacitor 92 having capacitance C1, and output to the external force detection circuit 40 as the voltage Vy. Then, when the switching element 93 is turned on, terminals of the capacitor 92 are short-circuited. As a result, the charge Qy stored in the capacitor 92 is discharged to zero coulomb, and the voltage V output to the external force detection circuit 40 becomes zero volt. Turning on the switching element 93 is resetting of the conversion output circuit 90c. Note that the voltage Vy output from the ideal conversion output circuit 90c is proportional to the amount of storage of the charge Qy output from the charge output element 10.

The switching element 93 is a semiconductor switching element such as a MOSFET (Metal Oxide Semiconductor Field Effect Transistor), for example. The semiconductor switching element is smaller and lighter than a mechanical switch and advantageous for reduction in size and weight of the force detector 1. Below, the case where a MOSFET is used as the switching element 93 will be explained as a representative example.

The switching element 93 has a drain electrode, a source electrode, and a gate electrode. Either of the drain electrode or the source electrode of the switching element 93 is connected to the first input terminal of the operation amplifier 91, and the other of the drain electrode or the source electrode is connected to the output terminal of the operation amplifier 91. Further, the gate electrode of the switching element 93 is connected to a drive circuit (not shown).

The same drive circuits or different drive circuits may be connected to the switching elements 93 of the respective conversion output circuits 90a, 90b, 90c. All synchronized on/off signals are input from the drive circuits to the respective switching elements 93. Thereby, the operation of the switching elements 93 of the respective output circuits 90a, 90b, 90c are synchronized. That is, on/off times of the switching elements 93 of the respective output circuits 90a, 90b, 90c coincide.

External Force Detection Circuit

The external force detection circuit 40 has a function of detecting applied external forces based on the voltage Vx output from the conversion output circuit 90a, the voltage Vz output from the conversion output circuit 90b, and the voltage Vy output from the conversion output circuit 90c. The external force detection circuit 40 has an AD converter 401 connected to the conversion output circuits 90a, 90b, 90c and a calculation unit 402 connected to the AD converter 401.

The AD converter 401 has a function of converting the voltages Vx, Vy, Vz from analog signals into digital signals. The voltages Vx, Vy, Vz digitally converted by the AD converter 401 are input to the calculation unit 402.

That is, when an external force such that the relative position of the first substrate 2 and the second substrate 3 is shifted in the α(X)-direction is applied, the AD converter 401 outputs the voltage Vx. Similarly, when an external force such that the relative position of the first substrate 2 and the second substrate 3 is shifted in the β(Y)-direction is applied, the AD converter 401 outputs the voltage Vy. Further, when an external force such that the relative position of the first substrate 2 and the second substrate 3 is shifted in the γ(Z)-direction is applied, the AD converter 401 outputs the voltage Vz.

The calculation unit 402 performs respective processes including correction for eliminating differences in sensitivity among the respective conversion output circuits 90a, 90b, 90c on the digitally converted voltages Vx, Vy, Vz, for example. Then, the calculation unit 402 outputs three signals proportional to the amounts of storage of the charges Qx, Qy, Qz output from the charge output element 10. The three signals correspond to the three axial forces (shear forces and compression/tension force) applied to the charge output element 10, and thereby, the force detector 1 may detect the three axial forces applied to the charge output element 10.

As shown in FIGS. 1 and 2, in the force detector 1, the convex part 21 (first convex part, columnar member or post) is provided on the first substrate 2. A surface of the first substrate 2 and a surface the second substrate 3 face each other at a distance such that the convex part 21 is located therebetween. Note that the upper surface (the surface facing the second substrate 3) 211 of the convex part 21 is a flat (planar) surface. The convex part 21 may be formed integrally with the first substrate 2 or formed as an individual member. Note that the constituent material of the convex part 21 is not particularly limited, however, for example, it may be the same as that of the first substrate 2.

Further, the position of the convex part 21 is not particularly limited, however, in the embodiment, the convex part 21 is placed in the center part of the first substrate 2.

Furthermore, the shape of the convex part 21 is not particularly limited, however, in the embodiment, the same shape as that of the charge output element 10, i.e., square in the plan view of the first substrate 2. The other shapes of the convex part 21 in the plan view include polygonal shapes including rectangular shapes and pentagonal shapes, elliptical shapes, and the like, for example.

In addition, a hole 41 into which the convex part 21 is inserted is formed in the part of the analog circuit board 4 in which the charge output element 10 is placed, i.e., in the center part. The hole 41 is a through hole penetrating the analog circuit board 4. The shape of hole 41 is not particularly limited, however, in the embodiment, it is the same shape as that of the convex part 21 in the plan view of the first substrate 2, i.e., square. Note that the analog circuit board 4 is supported by the convex part 21.

Similarly, a hole 51 into which the convex part 21 is inserted is formed in the part of the digital circuit board 5 in which the charge output element 10 is placed, i.e., in the center part. The shape of hole 51 is not particularly limited, however, in the embodiment, it is the same shape as that of the convex part 21 in the plan view of the first substrate 2, i.e., square. Note that the digital circuit board 5 is supported by the convex part 21.

Note that two holes 42 into which the two pressurization bolts 71 are inserted are formed in the analog circuit board 4, and two holes 52 into which the two pressurization bolts 71 are inserted are formed in the digital circuit board 5.

The convex part 21 is inserted into the hole 41 of the analog circuit board 4 and the hole 51 of the digital circuit board 5 and protrudes toward the charge output element 10. Further, the sensor device 6 is sandwiched by the convex part 21 and the second substrate 3, and thereby, the charge output element 10 is sandwiched by the convex part 21 and the second substrate 3 via the package 60. Note that the lower surface (the surface facing the first substrate 2) 36 of the second substrate 3 is a flat surface, the lower surface 36 is in contact with the center part of the lid member 62 of the sensor device 6, and the upper surface 211 of the convex part 21 is in contact with the base part 61.

Further, the dimensions of the convex part 21 are not particularly limited, however, the surface area of the contacting surface of the convex part 21 is preferably equal to or larger than the area of the charge output element 10 and more preferably larger than the area of the charge output element 10 in the plan view of the first substrate 2. Note that, in the illustrated configuration, the area of the convex part 21 is larger than the area of the charge output element 10. Furthermore, the charge output element 10 is placed within a periphery of the convex part 21 and the center line of the charge output element 10 coincides with the center line of the convex part 21 in the plan view of the first substrate 2 so that they are concentric (as seen from the direction perpendicular to the first substrate 2). In this case, the charge output element 10 should not be allowed to stick out from the convex part 21 in the plan view of the first substrate 2. Thereby, the entire charge output element 10 may be pressurized and, when performing the force detection, external forces are applied to the entire charge output element 10 and force detection with higher accuracy may be performed.

In addition, the first substrate 2 and the second substrate 3 are secured by the two pressurization bolts 71. Note that "securement" by the pressurization bolts 71 is performed while their movements in predetermined amounts of two objects to be secured are allowed. Specifically, the first substrate 2 and the second substrate 3 are secured by the two pressurization bolts 71 while their movements in predetermined amounts in the surface direction of the second substrate 3 are allowed. Note that this applies to the other embodiments.

The respective pressurization bolts 71 are placed with their heads 715 toward the second substrate 3 side, and inserted from holes 35 formed in the second substrate 3, pass through the holes 42 of the analog circuit board 4 and the holes 52 of the digital circuit board 5, respectively, and their external threads 716 are screwed with internal threads 25 formed in the first substrate 2. Further, by the respective pressurization bolts 71, pressure having predetermined amplitude in the Z-axis direction (see FIG. 4), i.e., pressurization is applied to the charge output element 10. Note that the magnitude of the pressurization is not particularly limited, however, it should be intentionally set to a desired amount.

Further, the positions of the respective pressurization bolts 71 are not particularly limited, however, in the embodiment, the respective pressurization bolts 71 are placed at equal angular intervals (intervals of 180°) along the circumferences (peripheries) of the first substrate 2, the second substrate 3, the analog circuit board 4, and the digital circuit board 5, i.e., to be opposed via the charge output element 10 in the plan view of the second substrate 3. Thereby, the first substrate 2 and the second substrate 3 may be secured with balance and each charge output element 10 may be pressurized with balance. Note that the number of pressurization bolts 71 is not limited to two, but may be three or more, for example.

Note that the constituent material of the pressurization bolts 71 is not particularly limited, however, for example, various resin materials, various metal materials, and the like may be used.

As described above, according to the force detector 1, the analog circuit board 4 and the digital circuit board 5 are provided between the first substrate 2 and the second substrate 3, and thereby, the detector may be downsized.

Further, the convex part 21 and the second substrate 3 may sandwich the sensor device 6 not via the analog circuit board 4 and the digital circuit board 5, i.e., sandwich the charge output element 10 via the package 60. Thereby, the charge output element 10 may be sufficiently pressurized and the accuracy of force detection may be improved.

Furthermore, the center part 625 of the lid member 62 of the package 60 protrudes toward the second substrate 3, and thereby, even when the lower surface 36 of the second substrate 3 is a flat surface, the charge output element 10 may be sufficiently pressurized and, when performing the force detection, difficulty in application of external forces may be prevented. Further, since the lower surface 36 of the second substrate 3 is a flat surface, alignment of the second substrate 3 with the charge output element 10 is not necessary during manufacturing and the force detector 1 may be readily manufactured.

Second Embodiment

Figure 5:
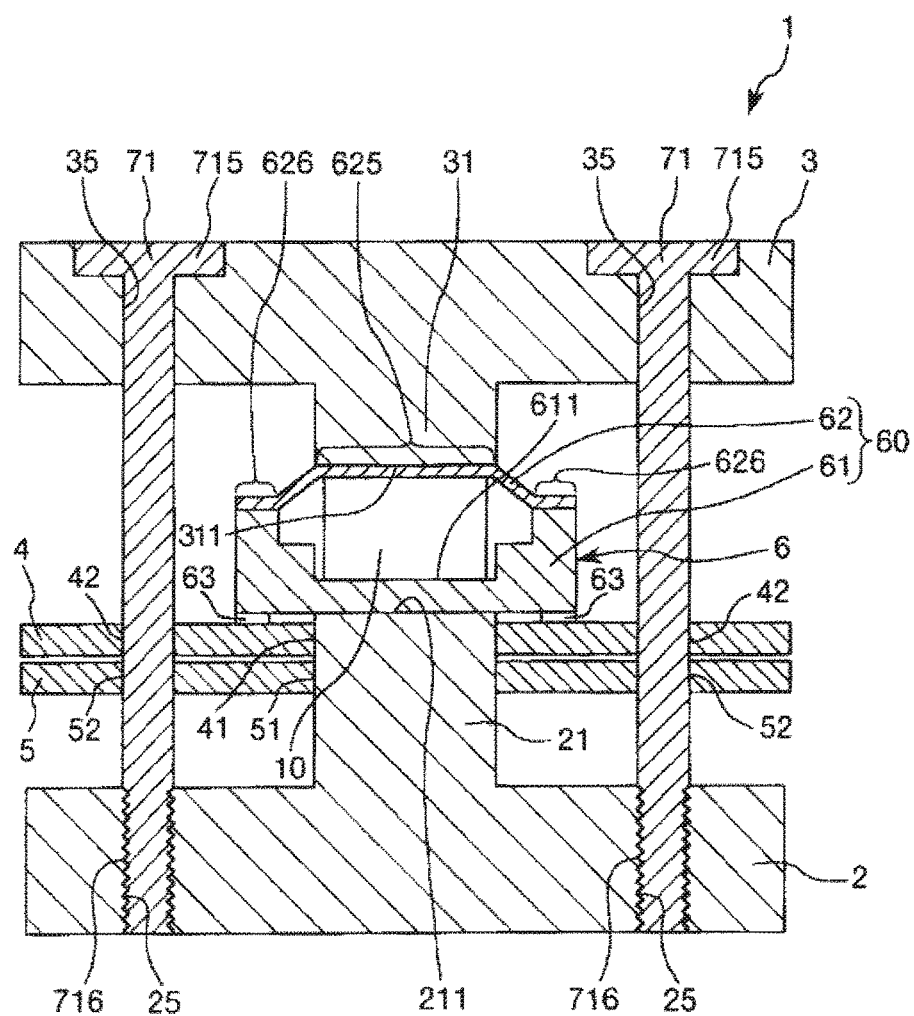
FIG. 5 is a sectional view showing a force detector according to a second embodiment of the invention.
Figure 6:
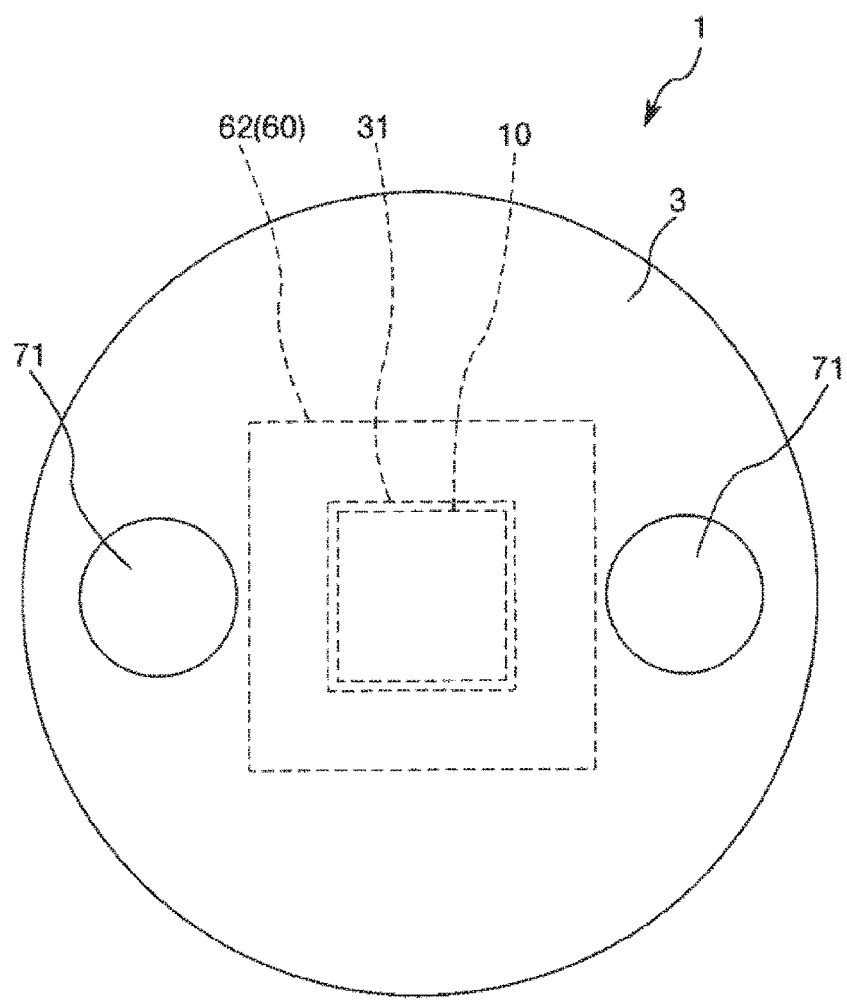
FIG. 6 is a plan view of the force detector shown in FIG. 5.

FIG. 5 is a sectional view showing a force detector according to the second embodiment of the invention. FIG. 6 is a plan view of the force detector shown in FIG. 5.

Note that, below, for convenience of explanation, the upside in FIG. 5 will be referred to as "upper" or "over" and the downside will be referred to as "lower" or "under".

Below, the second embodiment will be explained with a focus on the differences from the above described first embodiment, and the explanation of the same items will be omitted.

As shown in FIG. 5, in the force detector 1 of the second embodiment, a convex part (second convex part, columnar member or post) 31 is also provided on the second substrate 3. The convex part 31 is placed in a position corresponding to the charge output element 10 and protrudes toward the charge output element 10. Further, the lower surface (the surface facing the first substrate 2) 311 of the convex part 31 is a flat (planar) surface. The convex part 31 may be formed integrally with the second substrate 3 or formed as an individual member. Note that the constituent material of the convex part 31 is not particularly limited, however, for example, it may be the same as that of the second substrate 3.

Further, the shape of the convex part 31 is not particularly limited, however, in the embodiment, it is the same shape as that of the charge output element 10, i.e., square in the plan view of the first substrate 2. The other shapes of the convex part 31 in the plan view include polygonal shapes including rectangular shapes and pentagonal shapes, elliptical shapes, and the like, for example.

The sensor device 6 is placed between the convex part 21 and the convex part 31, the lower surface 311 of the convex part 31 is in contact with the lid member 62 and the upper surface 211 of the convex part 21 is in contact with the base part 61. That is, the sensor device 6 is sandwiched by the convex part 21 and the convex part 31, and thereby, the charge output element 10 is sandwiched by the convex part 21 and the convex part 31 via the package 60.

Further, the dimensions of the convex part 31 are not particularly limited, however, the surface area of the contacting surface of the convex part 31 is preferably equal to or larger than the area of the charge output element 10 and more preferably larger than the area of the charge output element 10 in the plan view of the first substrate 2. Note that, in the illustrated configuration, the area of the convex part 31 is larger than the area of the charge output element 10. Furthermore, the charge output element 10 is placed within the periphery of the convex part 31 and the center line of the charge output element 10 coincides with the center line of the convex part 31 in the plan view of the first substrate 2 so that they are concentric (as seen from the direction perpendicular to the first substrate 2). In this case, the charge output element 10 should not stick out from the convex part 31 in the plan view of the first substrate 2. Thereby, the entire charge output element 10 may be pressurized and, when performing the force detection, external forces are applied to the entire charge output element 10 and force detection with higher accuracy may be performed.

According to the force detector 1, the same advantages as those of the above described first embodiment may be obtained.

Third Embodiment

Figure 7:
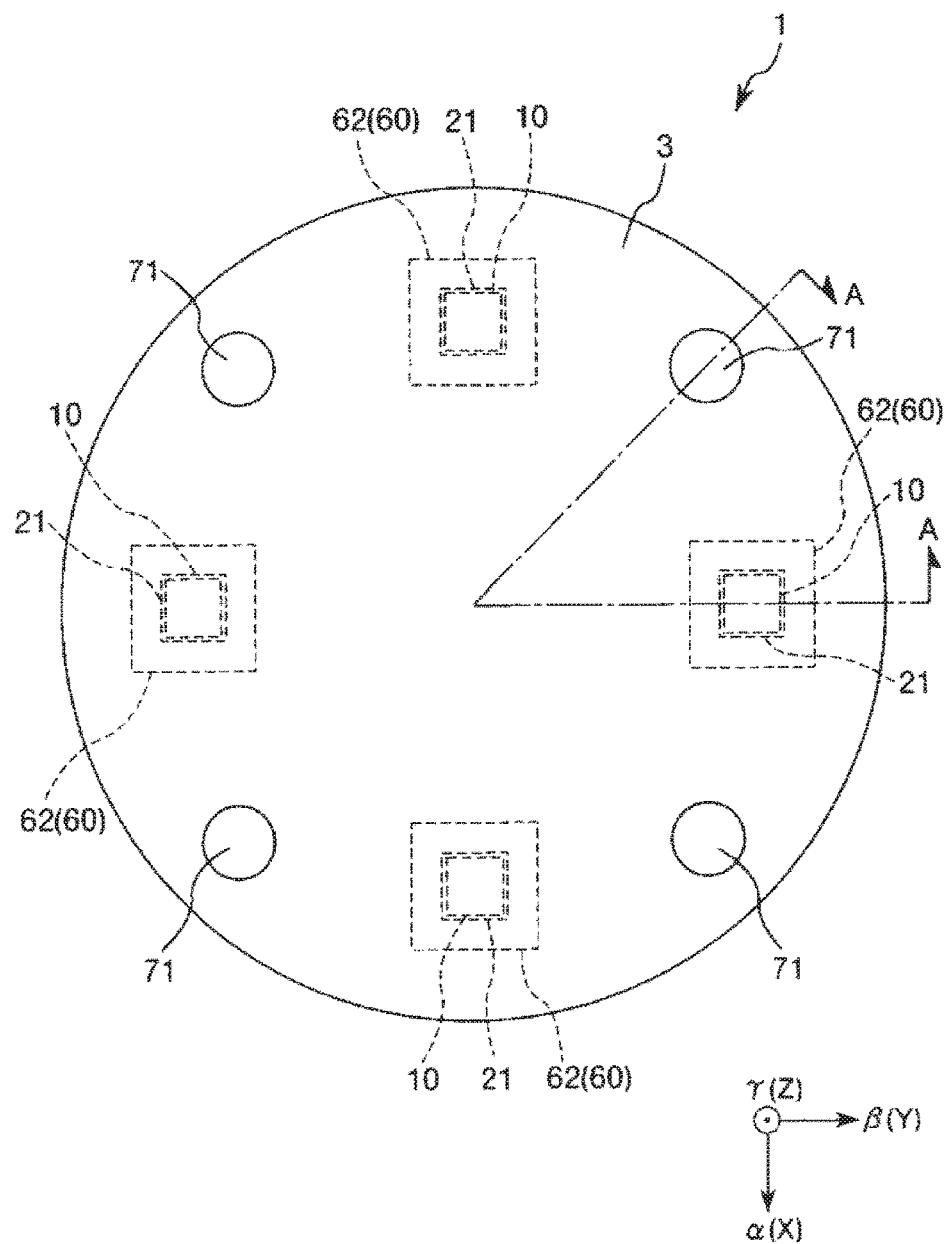
FIG. 7 is a plan view showing a force detector according to a third embodiment of the invention.
Figure 8:
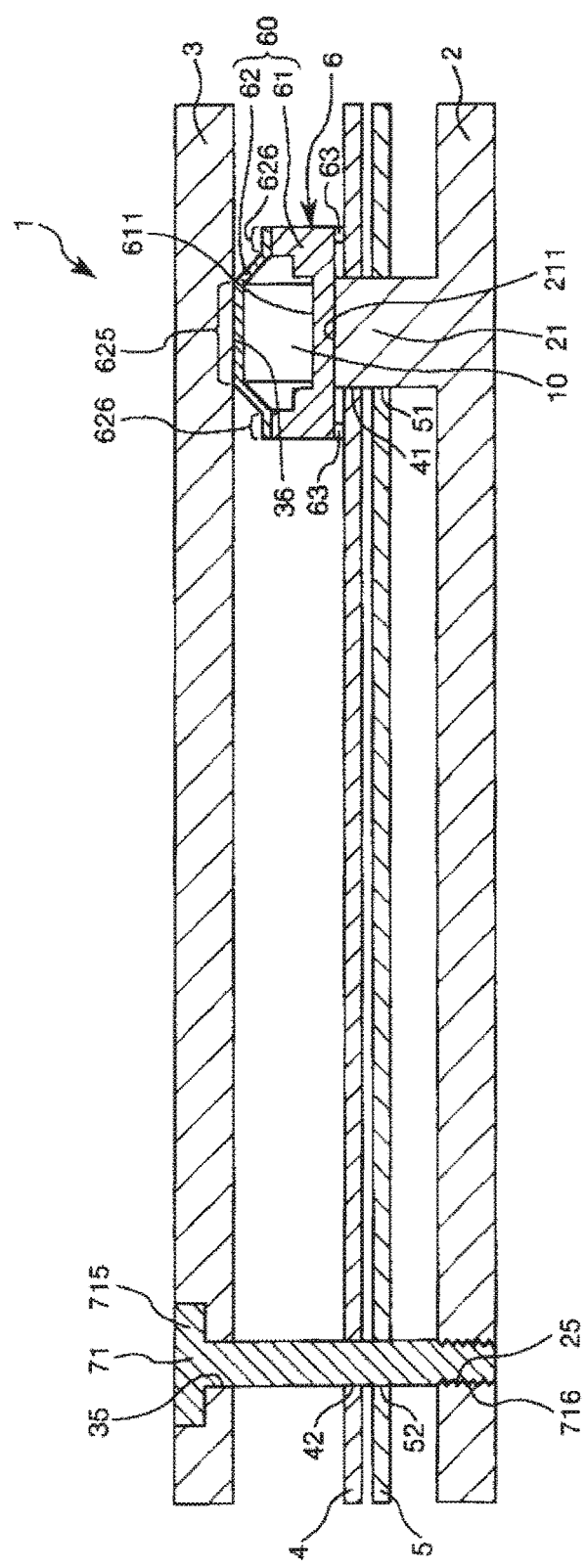
FIG. 8 is a sectional view along A-A line in FIG. 7.
Figure 9:
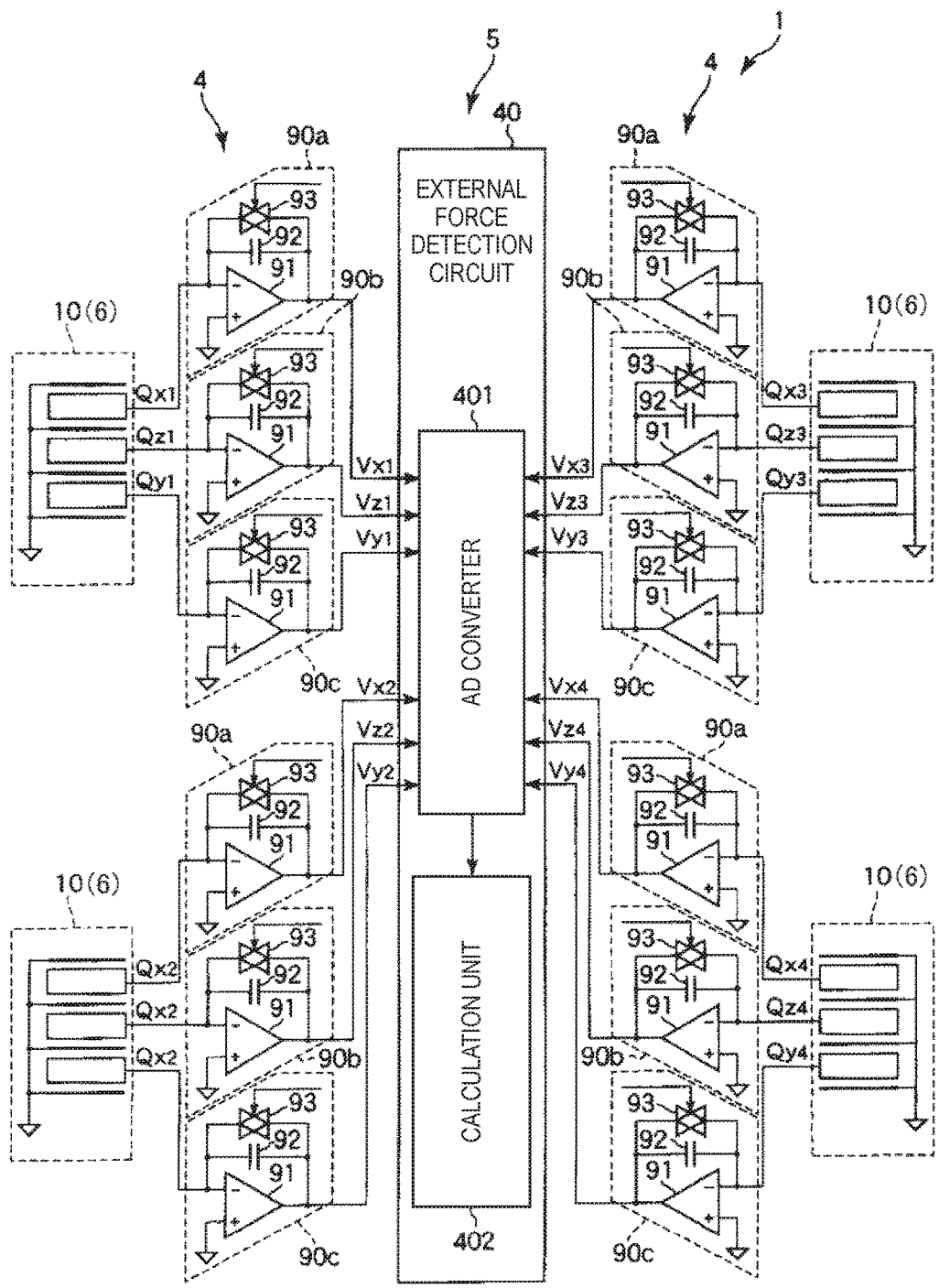
FIG. 9 is a circuit diagram schematically showing the force detector shown in FIG. 7.

FIG. 7 is a plan view showing a force detector according to the third embodiment of the invention. FIG. 8 is a sectional view along A-A line in FIG. 7. FIG. 9 is a circuit diagram schematically showing the force detector shown in FIG. 7.

Below, the third embodiment will be explained with a focus on the differences from the above described first embodiment, and the explanation of the same items will be omitted.

The force detector 1 of the third embodiment shown in FIGS. 7 and 8 has a function of detecting external forces (including moment), i.e., a function of detecting six axial forces (transitional force components (shearing forces) along x, y, z-axis directions and turning force components (moment) around the x, y, z-axes).

As shown in FIGS. 7 and 8, the force detector 1 has four sensor devices 6 and four pressurization bolts 71. The positions of the respective sensor devices 6 are not particularly limited, however, in the embodiment, the respective sensor devices 6, i.e., the respective charge output elements 10 are placed at equal angular intervals (intervals of 90°) along the circumferences of the first substrate 2, the second substrate 3, and the analog circuit board 4. Thereby, external forces may be detected without deviation. Further, the six axial forces may be detected. Furthermore, in the embodiment, all of the charge output elements 10 are directed in the same direction, but not limited to that.

In addition, four convex parts 21 are provided in correspondence with the respective sensor devices 6 on the first substrate 2. Note that the convex parts 21 have been explained in the first embodiment, and their explanation will be omitted.

The number of sensor devices 6 is not limited to four, however, for example, may be two, three, five, or more. Note that the number of sensor devices 6 is preferably two or more and more preferably three or more. The force detector 1 may detect the six axial forces as long as it has at least three sensor devices 6. In the case where only three sensor devices 6 are provided, the force detector 1 may be made lighter because the number of sensor devices 6 is smaller. Or, in the case where the four sensor devices 6 are provided as illustrated, the six axial forces may be obtained by very simple calculation, which will be described later, and the calculation unit 402 may be simplified.

Conversion Output Circuit

As shown in FIG. 9, the conversion output circuits 90a, 90b, 90c are connected to each charge output element 10. The respective conversion output circuits 90a, 90b, 90c are the same as the conversion output circuit 90 of the above described first and second embodiments, and their explanation will be omitted.

External Force Detection Circuit

The external force detection circuit 40 has a function of detecting applied external forces based on the voltages Vx1, Vx2, Vx3, Vx4 output from the respective conversion output circuits 90a, the voltages Vz1, Vz2, Vz3, Vz4 output from the respective conversion output circuits 90b, and the voltages Vy1, Vy2, Vy3, Vy4 output from the respective conversion output circuits 90c. The external force detection circuit 40 has an AD converter 401 connected to the conversion output circuits 90a, 90b, 90c and a calculation unit 402 connected to the AD converter 401.

The AD converter 401 has a function of converting the voltages Vx1, Vy1, Vz1, Vx2, Vy2, Vz2, Vx3, Vy3, Vz3, Vx4, Vy4, Vz4 from analog signals into digital signals. The voltages Vx1, Vy1, Vz1, Vx2, Vy2, Vz2, Vx3, Vy3, Vz3, Vx4, Vy4, Vz4 digitally converted by the AD converter 401 are input to the calculation unit 402.

That is, when an external force such that the relative position of the first substrate 2 and the second substrate 3 is shifted in the α(X)-direction is applied, the AD converter 401 outputs the voltages Vx1, Vx2, Vx3, Vx4. Similarly, when an external force such that the relative position of the first substrate 2 and the second substrate 3 is shifted in the β(Y)-direction is applied, the AD converter 401 outputs the voltages Vy1, Vy2, Vy3, Vy4. Further, when an external force such that the relative position of the first substrate 2 and the second substrate 3 is shifted in the γ(Z)-direction is applied, the AD converter 401 outputs the voltages Vz1, Vz2, Vz3, Vz4.

Further, the first substrate 2 and the second substrate can be relatively displaced by rotating around the x-axis, relatively displaced by rotating around the y-axis, and relatively displaced by rotating around the z-axis with respect to each other, and can transmit the external forces with the respective rotations to the charge output elements 10.

The calculation unit 402 has a function of calculating the transitional force component Fx along the x-axis, the transitional force component Fy along the y-axis, the transitional force component Fz along the z-axis, the turning force component Mx around the x-axis, the turning force component My around the y-axis, and the turning force component Mz around the z-axis based on the digitally converted voltages Vx1, Vy1, Vz1, Vx2, Vy2, Vz2, Vx3, Vy3, Vz3, Vx4, Vy4, Vz4. The respective force components may be obtained by the following equations.

$$Fx = Vx1 + Vx2 + Vx3 + Vx4$$

$$Fy = Vy1 + Vy2 + Vy3 + Vy4$$

$$Fz = Vz1 + Vz2 + Vz3 + Vz4$$

$$Mx = b \times (Vz4 - Vz2)$$

$$My = a \times (Vz3 - Vz1)$$

$$Mz = b \times (Vx2 - Vx4) + a \times (Vy1 - Vy3)$$

here a, b are constant numbers

In the above described manner, the force detector 1 may detect the six axial forces.

Note that the calculation unit 402 may perform correction for eliminating differences in sensitivity among the respective output circuits 90a, 90b, 90c or the like, for example.

Further, as shown in FIGS. 7 and 8, the first substrate 2 and the second substrate 3 are secured by the four pressurization bolts 71. Note that the number of pressurization bolts 71 is not limited to four, but may be two, three, five, or more, for example.

Furthermore, the positions of the respective pressurization bolts 71 are not particularly limited, however, in the embodiment, the respective pressurization bolts 71 are placed at equal angular intervals (intervals of 90°) along the circumferences of the first substrate 2, the second substrate 3, the analog circuit board 4, and the digital circuit board 5. Thereby, the first substrate 2 and the second substrate 3 may be secured with balance and the respective charge output elements 10 may be pressurized with balance.

According to the force detector 1, the same advantages as those of the above described first embodiment may be obtained.

Note that the third embodiment may be applied to the second embodiment. That is, the convex part 31 in the second embodiment may be provided on the second substrate 3 in the third embodiment.

Embodiment of Single-Arm Robot

Next, a single-arm robot as an embodiment of a robot of the invention will be explained with reference to FIG. 10. Below, the embodiment will be explained with a focus on the differences from the above described first, second, and third embodiments, and the explanation of the same items will be omitted.

Figure 10:
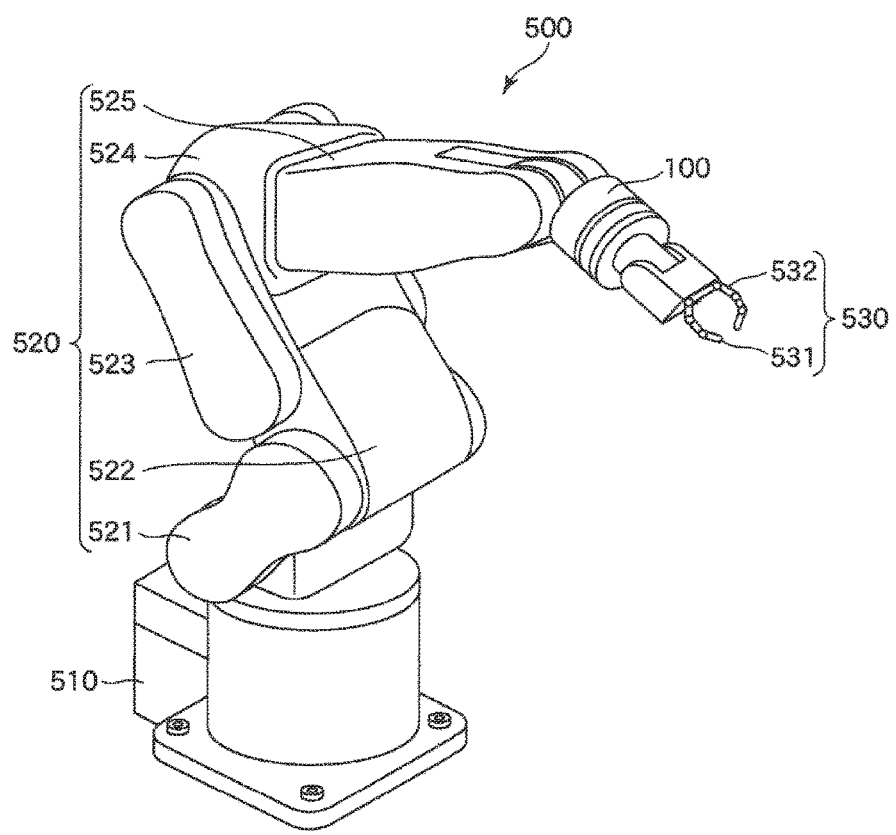
FIG. 10 shows an example of a single-arm robot using the force detector according to an embodiment of the invention.

FIG. 10 shows an example of the single-arm robot using the force detector of the invention. A single-arm robot 500 in FIG. 10 has a base 510, an arm 520, an end effector 530 provided at the distal end side of the arm 520, and a force detector 100 provided between the arm 520 and the end effector 530. Note that, as the force detector 100, the same one as those in the above embodiments is used.

The base 510 has a function of housing an actuator (not shown) that generates power for rotating the arm 520, a control unit (not shown) that controls the actuator, and the like. Further, the base 510 is fixed to a floor, a wall, a ceiling, a movable carriage, or the like, for example.

The arm 520 has a first arm element 521, a second arm element 522, a third arm element 523, a fourth arm element 524, and a fifth arm element 525, and is adapted to rotatably connect the adjacent arms. The arm 520 is driven by composite rotation or bending around the connecting parts of the respective arm elements under the control of the control unit.

The end effector 530 has a function of grasping an object. The end effector 530 has a first finger 531 and a second finger 532. The end effector 530 reaches a predetermined operation position by the driving of the arm 520, then, the separated distance between the first finger 531 and the second finger 532 is adjusted, and thereby, the object may be grasped.

Note that the end effector 530 is a hand here, however, not limited to that in the invention. The other examples of the end effector include a part testing tool, a part carrying tool, a part processing tool, apart assembly tool, a measuring instrument, and the like, for example. This applies to the end effectors in the other embodiments.

The force detector 100 has a function of detecting an external force applied to the end effector 530. The force detected by the force detector 100 is fed back to the control unit of the base 510, and thereby, the single-arm robot 500 may execute more precise work. Further, the single-arm robot 500 may sense the end effector 530 in contact with an obstacle or the like using the force detected by the force detector 100. Accordingly, an obstacle avoidance operation, an object damage avoidance operation, and the like that have been difficult to perform by the position control in the related art may be easily performed, and the single-arm robot 500 may execute work more safely.

Note that, in the illustrated configuration, the arm 520 has the five arm elements in total, however, the invention is not limited to that. The cases where the arm 520 has a single arm element, has two to four arm elements, and six or more arm elements fall within the scope of the invention.

Embodiment of Multi-Arm Robot

Next, a multi-arm robot as an embodiment of the robot of the invention will be explained with reference to FIG. 11. Below, the embodiment will be explained with a focus on the differences from the above described first, second, third, and fourth embodiments, and the explanation of the same items will be omitted.

Figure 11:
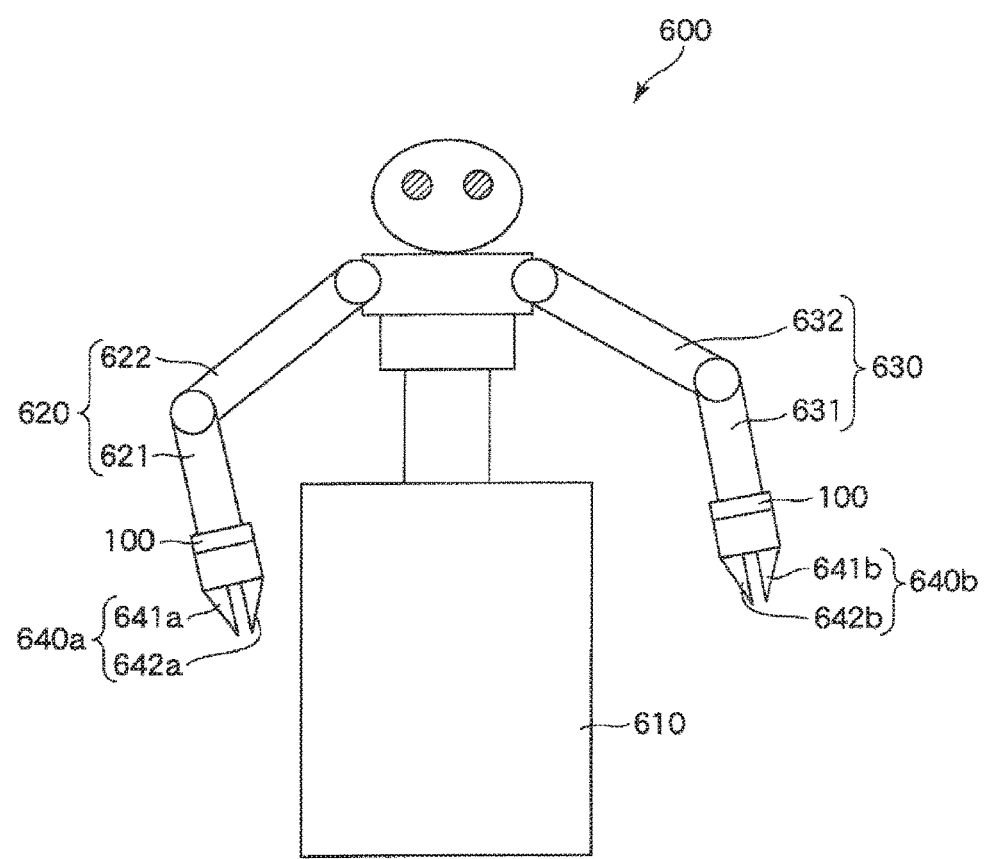
FIG. 11 shows an example of a multi-arm robot using the force detector according to an embodiment of the invention.

FIG. 11 shows an example of the multi-arm robot using the force detector of the invention. A multi-arm robot 600 in FIG. 11 has abase 610, a first arm 620, a second arm 630, a first end effector 640a provided at the distal end side of the first arm 620, a second end effector 640b provided at the distal end side of the second arm 630, and force detectors 100 provided between the first arm 620 and the first end effector 640a and between the second arm 630 and the second end effector 640b. Note that, as the force detectors 100, the same ones as those in the above embodiments are used.

The base 610 has a function of housing actuators (not shown) that generates power for rotating the first arm 620 and the second arm 630, a control unit (not shown) that controls the actuators, and the like. Further, the base 610 is fixed to a floor, a wall, a ceiling, a movable carriage, or the like, for example.

The first arm 620 is adapted to rotatably connect a first arm element 621 and a second arm element 622. The second arm 630 is adapted to rotatably connect a first arm element 631 and a second arm element 632. The first arm 620 and the second arm 630 are driven by composite rotation or bending around the connecting parts of the respective arm elements under the control of the control unit.

The first and second end effectors 640a, 640b have functions of grasping objects. The first end effector 640a has a first finger 641a and a second finger 642a. The second end effector 640b has a first finger 641b and a second finger 642b. The first end effector 640a reaches a predetermined operation position by the driving of the first arm 620, then, the separated distance between the first finger 641a and the second finger 642a is adjusted, and thereby, the object may be grasped. Similarly, the second end effector 640b reaches a predetermined operation position by the driving of the second arm 630, then, the separated distance between the first finger 641b and the second finger 642b is adjusted, and thereby, the object may be grasped.

The force detectors 100 have a function of detecting external forces applied to the first and second end effectors 640*a*, 640*b*. The forces detected by the force detectors 100 are fed back to the control unit of the base 610, and thereby, the multi-arm robot 600 may execute work more precisely. Further, the multi-arm robot 600 may sense the first and second end effectors 640*a*, 640*b* in contact with an obstacle or the like using the forces detected by the force detectors 100. Accordingly, an obstacle avoidance operation, an object damage avoidance operation, and the like that have been difficult to perform by the position control in the related art may be easily performed, and the multi-arm robot 600 may execute work more safely.

Note that, in the illustrated configuration, the two arms are provided in total, however, the invention is not limited to that. The case where the multi-arm robot 600 has three or more arms falls within the scope of the invention.

Embodiments of Electronic Component Testing Apparatus and Electronic Component Carrying Apparatus Next, an electronic component testing apparatus and an electronic component carrying apparatus as embodiments of the invention will be explained with reference to FIGS. 12 and 13. Below, the embodiments will be explained with a focus on the differences from the above described first, second, and third embodiments, and the explanation of the same items will be omitted.

Figure 12:
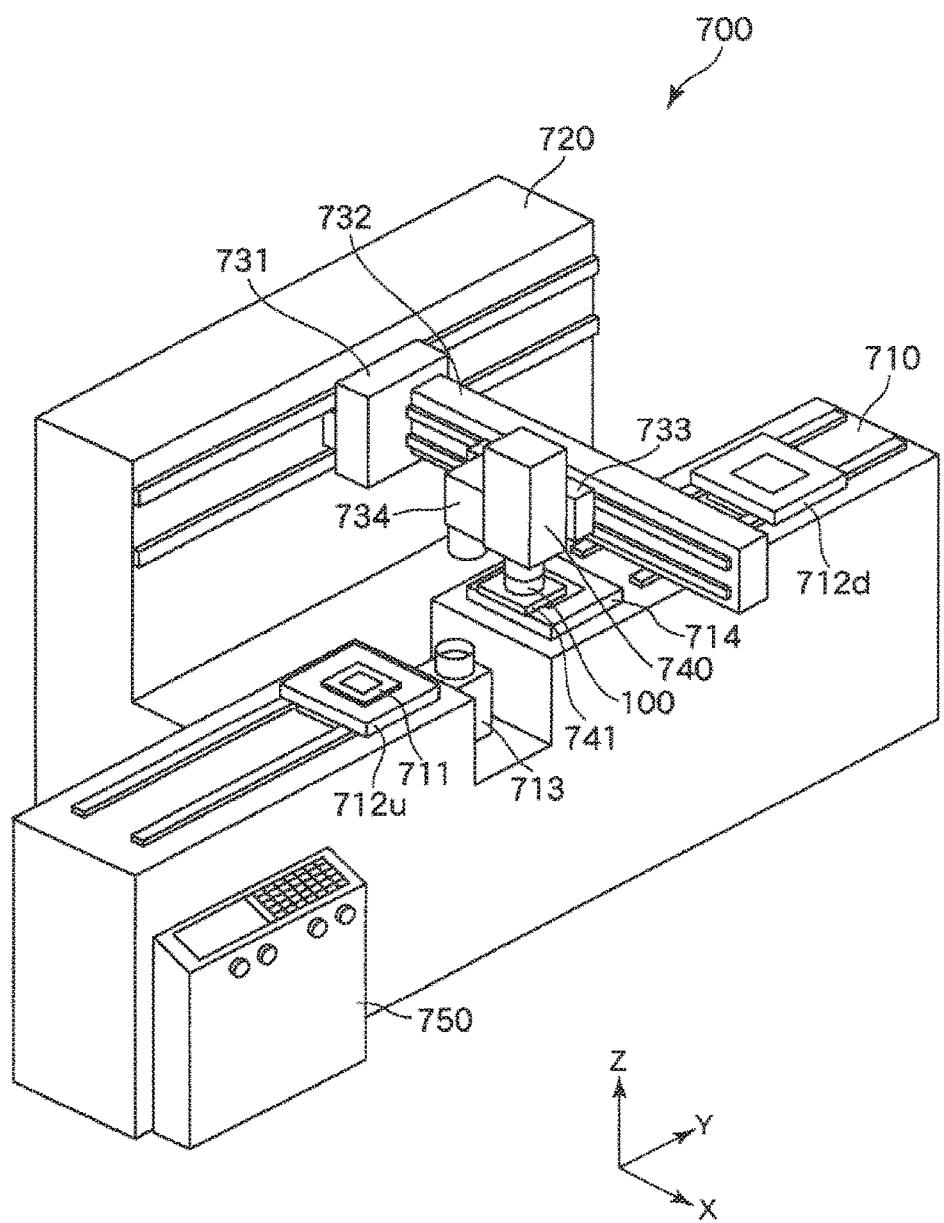
FIG. 12 shows examples of an electronic component testing apparatus and an electronic component carrying apparatus using the force detector according to an embodiment of the invention.

FIG. 12 shows examples of the electronic component testing apparatus and a part carrying apparatus using the force detector of the invention. FIG. 13 shows an example of the electronic component carrying apparatus using the force detector according to the invention.

An electronic component testing apparatus 700 in FIG. 12 has a base 710 and a support 720 stood on the side surface of the base 710. On the upper surface of the base 710, an upstream-side stage 712*u* on which an electronic component 711 to be tested is mounted and carried and a downstream-side stage 712*d* on which the electronic component 711 that has been tested is mounted and carried are provided. Further, an imaging unit 713 for confirmation of the attitude of the electronic component 711 and a testing bench 714 on which the electronic component 711 is set for testing of electrical characteristics are provided between the upstream-side stage 712*u* and the downstream-side stage 712*d*. Note that examples of the electronic component 711 include semiconductors, semiconductor wafers, display devices such as CLD and OLED, crystal devices, various sensors, inkjet heads, various MEMS devices, and the like.

Further, on the support 720, a Y-stage 731 is provided movably in a direction (Y-direction) in parallel to the upstream-side stage 712*u* and the downstream-side stage 712*d* of the base 710 and an arm part 732 is extended from the Y-stage 731 in a direction (X-direction) toward the base 710. Furthermore, an X-stage 733 is provided movably in the X-direction on the side surface of the arm part 732. On the X-stage 733, an imaging camera 734 and an electronic component carrying apparatus 740 including a Z-stage movable in vertical directions (Z-directions) are provided. Further, a grasping part 741 that grasps the electronic component 711 is provided at the end side of the electronic component carrying apparatus 740. Furthermore, a force detector 100 is provided between the end of the electronic component carrying apparatus 740 and the grasping part 741. In addition, a control unit 750 that controls the entire operation of the electronic component testing apparatus 700 is provided on a surface of the front side of the base 710. Note that, as the force detector 100, the same one as the above described respective embodiments is used.

The electronic component testing apparatus 700 performs a test of the electronic component 711 in the following manner. First, the electronic component 711 to be tested is mounted on the upstream-side stage 712*u* and moved close to the testing bench 714. Then, the electronic component carrying apparatus 740 is moved to the position immediately above the electronic component 711 mounted on the upstream-side stage 712*u* by moving the Y-stage 731 and the X-stage 733. In this regard, the position of the electronic component 711 may be confirmed using the imaging camera 734. Then, the electronic component carrying apparatus 740 is moved downward using the Z-stage within the electronic component carrying apparatus 740, the electronic component 711 is grasped by the grasping part 741, and then, the electronic component carrying apparatus 740 is moved to above the imaging unit 713 without change, and the attitude of the electronic component 711 is confirmed using the imaging unit 713. Then, the attitude of the electronic component 711 is adjusted using a fine adjustment mechanism built in the electronic component carrying apparatus 740. Then, the electronic component carrying apparatus 740 is moved onto the testing bench 714, and then, the electronic component 711 is set on the testing bench 714 by moving the Z-stage within the electronic component carrying apparatus 740. Since the attitude of the electronic component 711 has been adjusted using the fine adjustment mechanism within the electronic component carrying apparatus 740, the electronic component 711 can be set in a proper position on the testing bench 714. Then, the electrical characteristics test of the electronic component 711 using the testing bench 714 is ended, and then, in turn, the electronic component 711 is removed from the testing bench 714, the electronic component carrying apparatus 740 is moved onto the downstream-side stage 712*d* by moving the Y-stage 731 and the X-stage 733, and the electronic component 711 is put on the downstream-side stage 712*d*. Finally, the downstream-side stage 712*d* is moved and the electronic component 711 that has been tested is carried to a predetermined position.

Figure 13:
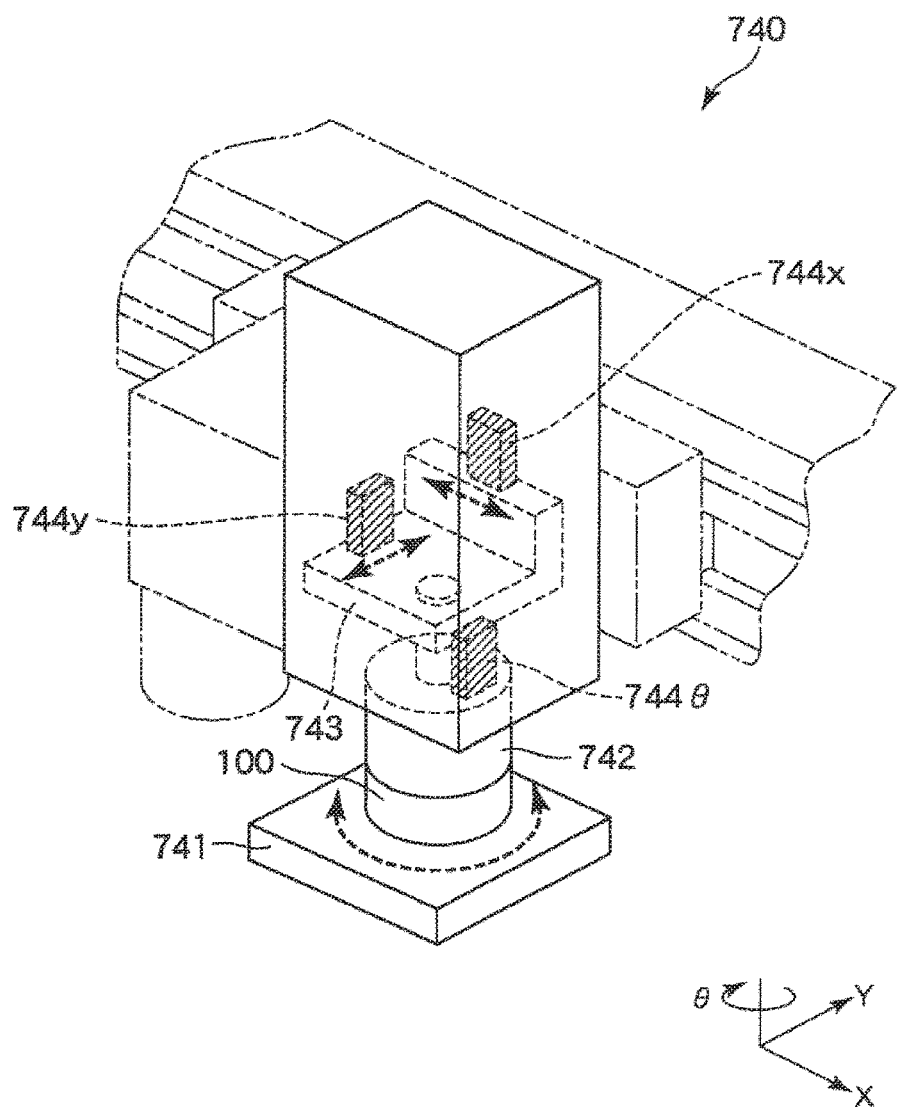
FIG. 13 shows an example of the electronic component carrying apparatus using the force detector according to an embodiment of the invention.

FIG. 13 shows the electronic component carrying apparatus 740 including the force detector 100. The electronic component carrying apparatus 740 has the grasping part 741, the six-axial force detector 100 connected to the grasping part 741, a rotation shaft 742 connected to the grasping part 741 via the six-axial force detector 100, and a fine adjustment plate 743 rotatably attached to the rotation shaft 742. Further, the fine adjustment plate 743 is movable in the X-direction and the Y-direction while being guided by a guide mechanism.

Further, a piezoelectric motor 744θ for rotation direction is mounted to face the end surface of the rotation shaft 742, and a drive convex portion (not shown) of the piezoelectric motor 744θ is pressed against the end surface of the rotation shaft 742. Accordingly, by activation of the piezoelectric motor 744θ, the rotation shaft 742 (and the grasping part 741) can be rotated to an arbitrary angle in the θ-direction. Further, a piezoelectric motor 744*x* for X-direction and a piezoelectric motor 744*y* for Y-direction are provided to face the fine adjustment plate 743, and their drive convex portions (not shown) are pressed against the surface of the fine adjustment plate 743. Accordingly, by activation of the piezoelectric motor 744*x*, the fine adjustment plate 743 (and the grasping part 741) may be moved to an arbitrary distance in the X-direction, and similarly, by activation of the piezoelectric motor 744*y*, the fine adjustment plate 743 (and the grasping part 741) may be moved to an arbitrary distance in the Y-direction.

Furthermore, the force detector 100 has a function of detecting an external force applied to the grasping part 741. The force detected by the force detector 100 is fed back to the control unit 750, and thereby, the electronic component carrying apparatus 740 and the electronic component testing apparatus 700 may execute work more precisely. In addition, the grasping part 741 in contact with an obstacle or the like may be sensed using the force detected by the force detector 100. Accordingly, an obstacle avoidance operation, an object damage avoidance operation, and the like that have been difficult to perform by the position control in the related art may be easily performed, and the electronic component carrying apparatus 740 and the electronic component testing apparatus 700 may execute work more safely.

Embodiment of Part Processing Apparatus

Next, an embodiment of a part processing apparatus of the invention will be explained with reference to FIG. 14. Below, the embodiment will be explained with a focus on the differences from the above described first, second, and third embodiments, and the explanation of the same items will be omitted.

Figure 14:
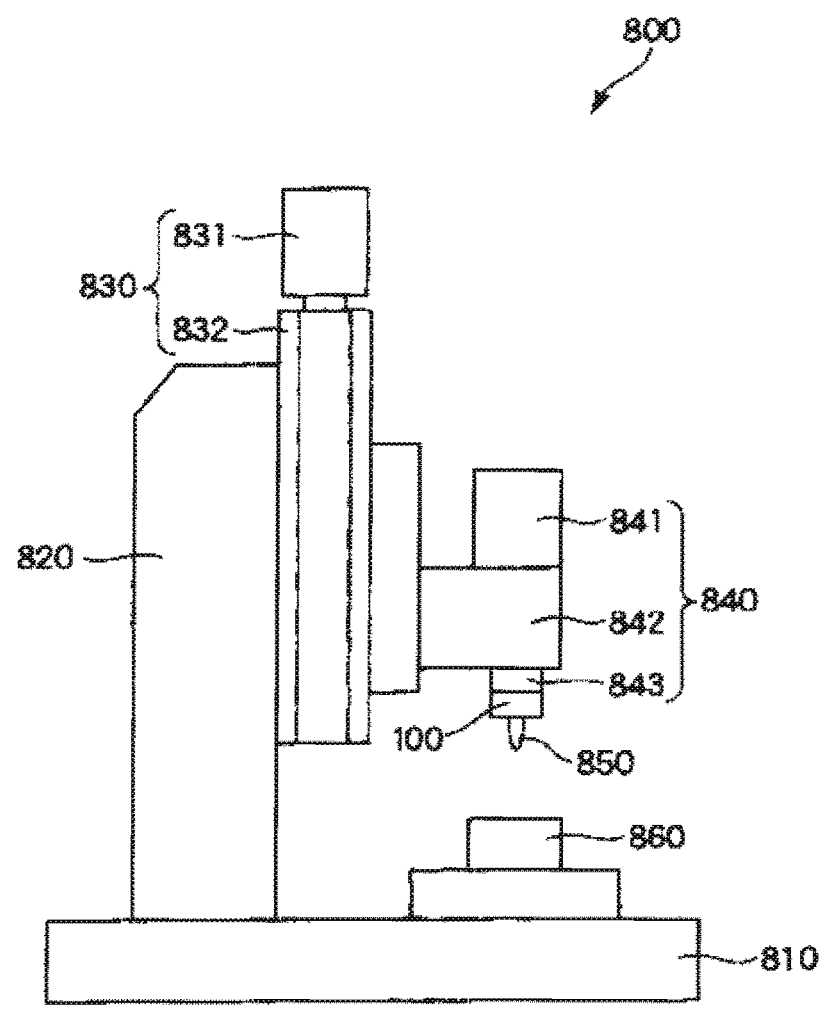
FIG. 14 shows an example of a part processing apparatus using the force detector according to an embodiment of the invention.

FIG. 14 shows an example of the part processing apparatus using the force detector according to the invention. The part processing apparatus 800 in FIG. 14 has a base 810, a support 820 stood on the upper surface of the base 810, a feed mechanism 830 provided on the side surface of the support 820, a tool displacement unit 840 attached to the feed mechanism 830 so as to move up and down, the force detector 100 connected to the tool displacement unit 840, and a tool 850 attached to the tool displacement unit 840 via the force detector 100. Note that as the force detector 100, the same one as those in the above embodiments is used.

The base 810 is a bench for mounting and fixing a processed part 860. The support 820 is a column for fixing the feed mechanism 830. The feed mechanism 830 has a function of moving up and down the tool displacement unit 840. The feed mechanism 830 has a feed motor 831, and a guide 832 that moves up and down the tool displacement unit 840 based on the output from the feed motor 831. The tool displacement unit 840 has a function of causing displacement including rotation and vibration of the tool 850. The tool displacement unit 840 has a displacement motor 841, a tool attachment part 843 provided at the end of the main shaft (not shown) connected to the displacement motor 841, and a holding part 842 attached to the tool displacement unit 840 and holding the main shaft. The tool 850 is attached to the tool attachment part 843 of the tool displacement unit 840 via the force detector 100 and used for processing the processed part 860 in response to the displacement caused by the tool displacement unit 840. The tool 850 is not particularly limited, however, for example, it may be a wrench, a cross slot screwdriver, a straight slot screwdriver, a cutter, a circular saw, a nipper, a borer, a drill, a milling cutter, or the like.

The force detector 100 has a function of detecting an external force applied to the tool 850. The external force detected by the force detector 100 is fed back to the feed motor 831 and the displacement motor 841, and thereby, the part processing apparatus 800 may execute part processing work more precisely. In addition, the tool 850 in contact with an obstacle or the like may be sensed using the external force detected by the force detector 100. Accordingly, when an obstacle or the like is brought into contact with the tool 850, an emergency stop may be executed, and the part processing apparatus 800 may execute safer part processing work.

Embodiment of Moving Object

Next, an embodiment of a moving object of the invention will be explained with reference to FIG. 15. Below, the embodiment will be explained with a focus on the differences from the above described first, second, and third embodiments, and the explanation of the same items will be omitted.

Figure 15:
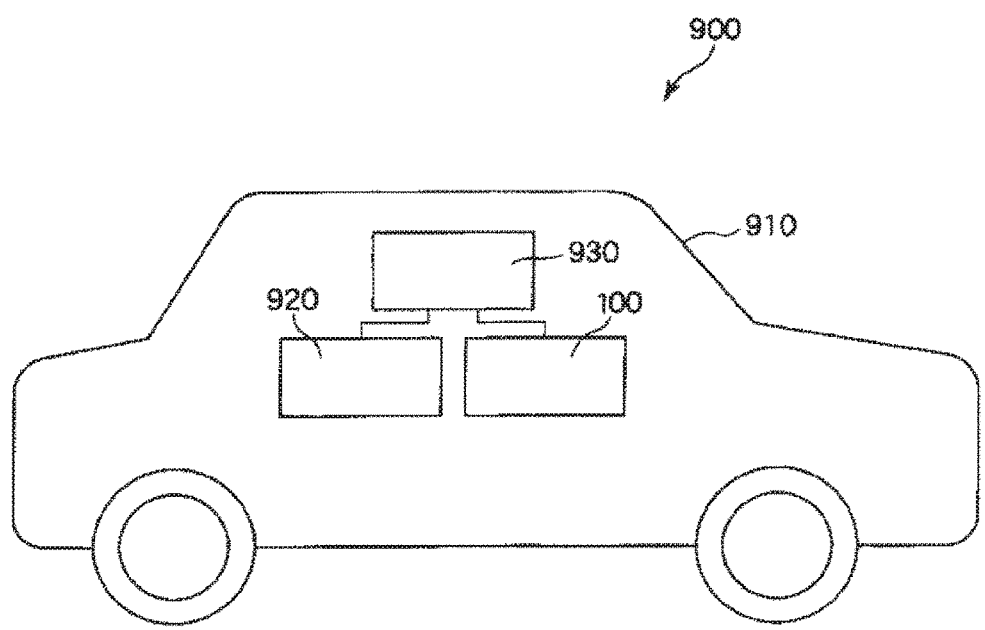
FIG. 15 shows an example of a moving object using the force detector according to an embodiment of the invention.

FIG. 15 shows an example of the moving object using the force detector according to the invention. The moving object 900 shown in FIG. 15 may move using provided power. The moving object 900 is not particularly limited, however, for example, it may be a means of transportation including an automobile, a motorbike, an airplane, a ship, and a train, robots including a biped walking robot and a wheeled robot, and the like.

The moving object 900 has a main body 910 (e.g., a housing of means of transportation, a main body of a robot, or the like), a power unit 920 that supplies power for moving the main body 910, the force detector 100 according to the invention that detects an external force generated by the movement of the main body 910, and a control unit 930. Note that, as the force detector 100, the same one as those in the above embodiments is used.

When the main body 910 is moved by the power supplied from the power unit 920, vibration, acceleration, or the like is generated with the movement. The force detector 100 detects external forces by the vibration, acceleration, or the like with the movement. The external forces detected by the force detector 100 are transmitted to the control unit 930. The control unit 930 controls the power unit 920 and the like in response to the external forces transmitted from the force detector 100, and thereby, may execute control including attitude control, vibration control, and acceleration control.

The force detector, the robot, the electronic component carrying apparatus, the electronic component testing apparatus, the part processing apparatus, and the moving object according to the invention have been explained with reference to the illustrated embodiments, however, the invention is not limited to those and the configurations of the respective parts may be replaced by any configurations having the same functions. Further, any other configurations may be added to the invention.

Furthermore, the invention may be a combination of any two or more configurations (features) of the above described embodiments.

In addition, in the invention, the package, i.e., the first member and the second member are dispensable.

Further, the element may stick out from the first convex part in the plan view of the first substrate.

Furthermore, the element may stick out from the second convex part in the plan view of the first substrate.

In the embodiments, the elements using piezoelectric materials have been employed as the elements that output signals in response to external forces, however, in the invention, the elements are not limited to those as long as their output changes in response to the applied external forces, and, for example, elements using pressure-sensitive conductors or the like may be used.

Further, in the invention, in place of the pressurization bolts, bolts not having the function of pressurizing the elements may be used, and a securing method using a fastener other than bolts may be employed.

Furthermore, the robot according to the invention is not limited to the armed robot (robot arm), but may be another type of robot including a scalar robot, a legged walking (running) robot, or the like, for example, as long as the robot employs a force detector.

In addition, the force detector according to the invention may be applied not only to the robot, the electronic component carrying apparatus, the electronic component testing apparatus, the part processing apparatus, and the moving object, but to other devices including other carrying apparatus, other testing apparatus, a measurement device such as a vibration meter, an acceleration meter, a gravity meter, a dynamometer, a seismometer, or an inclinometer, an input device, or the like.

What is claimed is:

1. A force detector comprising:
a first substrate;
a second substrate;
a circuit board between the first substrate and the second substrate; and
a sensor device having a first member, a second member and an element outputting a signal in response to an external pressure change,
wherein the element is located between the first member and the second member, and
the first member is in direct contact with each of the first substrate and the circuit board.

2. The force detector according to claim 1, wherein the first substrate is provided with a convex part protruding toward the sensor device, and
a contact point between the first member and the first substrate is on the convex part.

3. The force detector according to claim 1, wherein the second member is in contact with the second substrate.

4. The force detector according to claim 1, wherein a terminal electrically connected to the element and the circuit board is provided on a surface of the first member, and
the surface of the first member on which the terminal is provided is in contact with the first substrate.

5. The force detector according to claim 1, wherein the sensor device is sandwiched by the first substrate and the second substrate.

6. The force detector according to claim 5, wherein a part of the first substrate overlaps with the circuit board as viewed in a direction perpendicular to a direction in which the sensor device is sandwiched by the first substrate and the second substrate.

7. The force detector according to claim 1, wherein the element is pressurized by the first substrate and the second substrate.

8. The force detector according to claim 1, comprising a plurality of the sensor devices, wherein the sensor devices are located at equal angular intervals along a periphery of the first or second member.

9. The force detector according to claim 1, wherein the element includes crystal.

10. The force detector according to claim 1, wherein the first member is provided with a concave part.

11. The force detector according to claim 10, wherein the concave part is provided with the element and sealed by the second member.

12. The force detector according to claim 1, wherein a hole through which a pressurization bolt is inserted is formed in the circuit board.

13. A robot comprising:
a base; and
a movable member connected to the base and the force detector according to claim 1 is connected to the movable member.

14. The robot according to claim 13, wherein the first substrate is provided with a convex part protruding toward the sensor device, and
a contact point between the first member and the first substrate is on the convex part.

15. The robot according to claim 13, wherein the second member is in contact with the second substrate.

16. The robot to claim 13, wherein a terminal electrically connected to the element and the circuit board is provided on a surface of the first member, and
the surface of the first member on which the terminal is provided is in contact with the first substrate.

17. The robot according to claim 13, wherein the sensor device is sandwiched by the first substrate and the second substrate.

18. The robot according to claim 17, wherein a part of the first substrate overlaps with the circuit board as viewed in a direction perpendicular to a direction in which the sensor device is sandwiched.

19. The robot according to claim 13, wherein the element is pressurized by the first substrate and the second substrate.

20. The robot according to claim 13, wherein the force detector includes a plurality of the sensor devices, and
the sensor devices are located at equal angular intervals along a periphery of the first or second member.

* * * * *